(12) United States Patent
Gleichauf

(10) Patent No.: US 10,764,258 B2
(45) Date of Patent: Sep. 1, 2020

(54) BLOCKCHAIN INFRASTRUCTURE FOR SECURING AND/OR MANAGING ELECTRONIC ARTIFACTS

(71) Applicant: ARM IP Limited, Cambridge (GB)

(72) Inventor: Paul Harry Gleichauf, Los Altos, CA (US)

(73) Assignee: ARM IP Limited, Cambridge (GB)

( * ) Notice: Subject to any disclaimer, the term of this patent is extended or adjusted under 35 U.S.C. 154(b) by 244 days.

(21) Appl. No.: 16/024,322

(22) Filed: Jun. 29, 2018

(65) Prior Publication Data

US 2020/0007513 A1    Jan. 2, 2020

(51) Int. Cl.
 *H04L 29/06* (2006.01)
 *G06F 8/65* (2018.01)
 *G06F 9/4401* (2018.01)

(52) U.S. Cl.
 CPC ............ *H04L 63/0428* (2013.01); *G06F 8/65* (2013.01); *G06F 9/4401* (2013.01)

(58) Field of Classification Search
 None
 See application file for complete search history.

(56) References Cited

U.S. PATENT DOCUMENTS 10,102,265 B1 * 10/2018 Madisetti ............ G06Q 20/0658
10,180,912 B1 *  1/2019 Franklin .............. G06F 12/1408
2018/0176228 A1 *  6/2018 He ........................... H04L 63/105
2018/0336552 A1 * 11/2018 Bohli .................... H04L 67/1097
2018/0341930 A1 * 11/2018 Moir .................... G06Q 20/3825
2019/0034465 A1 *  1/2019 Shimamura ......... G06F 16/2474
2019/0079998 A1 *  3/2019 Rush ..................... H04L 9/0643
2019/0171849 A1 *  6/2019 Assenmacher ......... H04L 69/04
2019/0207770 A1 *  7/2019 Zhou ..................... H04L 9/3247
2019/0296907 A1 *  9/2019 Versteeg ............... H04L 9/0894
2019/0349733 A1 * 11/2019 Nolan ................. H04L 41/0806
2019/0379797 A1 * 12/2019 Sahagun ............ H04N 1/00411

FOREIGN PATENT DOCUMENTS

WO    WO2018028229    2/2018

OTHER PUBLICATIONS

Croman, Kyle et al: "On Scaling Decentralized Blockchains", Aug. 31, 2016; International Conference of Computer Analysis of Images and Patterns. CAIP 2017: Computer Analysis of Images and Patterns; [Lecture Notes in Computer Science; Lect. Notes Computer] Springer, Berlin, Heidelberg, pp. 106-125.
PCT/GB2019/051763/ International Search Report and Written Opinion, dated Aug. 20, 2019, 15 pages.

* cited by examiner

*Primary Examiner* — Shin-Hon (Eric) Chen
(74) *Attorney, Agent, or Firm* — Berkeley Law & Technology Group, LLP

(57) ABSTRACT

Briefly, example methods, apparatuses, and/or articles of manufacture are disclosed that may be implemented, in whole or in part, to facilitate and/or support one or more operations and/or techniques for blockchain infrastructure for securing and/or managing electronic artifacts, such as implemented in connection with one or more computing and/or communication networks and/or protocols.

22 Claims, 9 Drawing Sheets

BLOCKCHAIN INFRASTRUCTURE FOR SECURING AND/OR MANAGING ELECTRONIC ARTIFACTS

BACKGROUND

1. Field

The present disclosure relates generally to blockchain infrastructure and, more particularly, to blockchain infrastructure for securing and/or managing electronic artifacts.

2. Information

The Internet is widespread. The World Wide Web or simply the Web, provided by the Internet, is growing rapidly, at least in part, from the large amount of content or data being added seemingly on a daily basis. A wide variety of content or data in the form of stored signals, such as, for example, text files, images, audio files, video files, web pages, or the like is continually being acquired, identified, located, retrieved, collected, stored, viewed, communicated, etc. by electronic devices, which are becoming more ubiquitous in our increasingly inter-connected world. More recently, there appears to be a number of electronic devices in the market that include firmware and/or software from relatively smaller and/or ephemeral companies still new to the market, quick to create, quick to disappear, many in number. At times, these or like electronic devices are often "orphaned," such as if artifact originators, such as entities (e.g., vendors, companies, etc.) that have developed firmware and/or software needed and/or useful to maintain and/or operate such devices, for example, go out of business or wither away to such an extent that they no longer have the skills, abilities, desire, etc. to update and/or maintain these devices.

In some instances, these or like electronic devices may become a liability to their owners, operators, etc., such as if used without appropriate maintenance, updates, etc. As an illustration, consider an "Internet of Things" or IoT device, such as a field surveillance or security camera, for example, and firmware to connect the camera to a cloud service that relays alerts to some other device, such as a cell phone. Such a camera may remain deployed and be in operative use for many years, decades even, provided that associated firmware is up to date. If the firmware is outdated, however, the camera may become a liability to its owner and/or operator, perhaps because of compromised security, perhaps because its operational parameters need to compensate for new environmental factors and/or aging of the device (e.g., higher resolution, color display, memory footprint, etc.), or some other aspects not fully anticipated at the time the camera was originally designed and/or deployed. As such, for certain electronic devices, such as IoT devices and/or those created by smaller and/or ephemeral companies, for example, lack of updates necessary to make such devices work correctly, securely, etc. may endanger associated infrastructures and even the lives of those dependent upon their use. Thus, an approach for securing and/or managing electronic artifacts, such as associated software, firmware, hardware designs, etc. that may be resilient not only to the failure of an originator of the artifacts, but also to a process of securing and/or managing the artifacts itself, such as if companies that have created the devices and/or corresponding artifacts no longer find them a viable business, for example, may be desirable.

BRIEF DESCRIPTION OF THE DRAWINGS

Claimed subject matter is particularly pointed out and distinctly claimed in the concluding portion of the specification. However, both as to organization and/or method of operation, together with objects, features, and/or advantages thereof, it may best be understood by reference to the following detailed description if read with the accompanying drawings in which:

Figure 1:
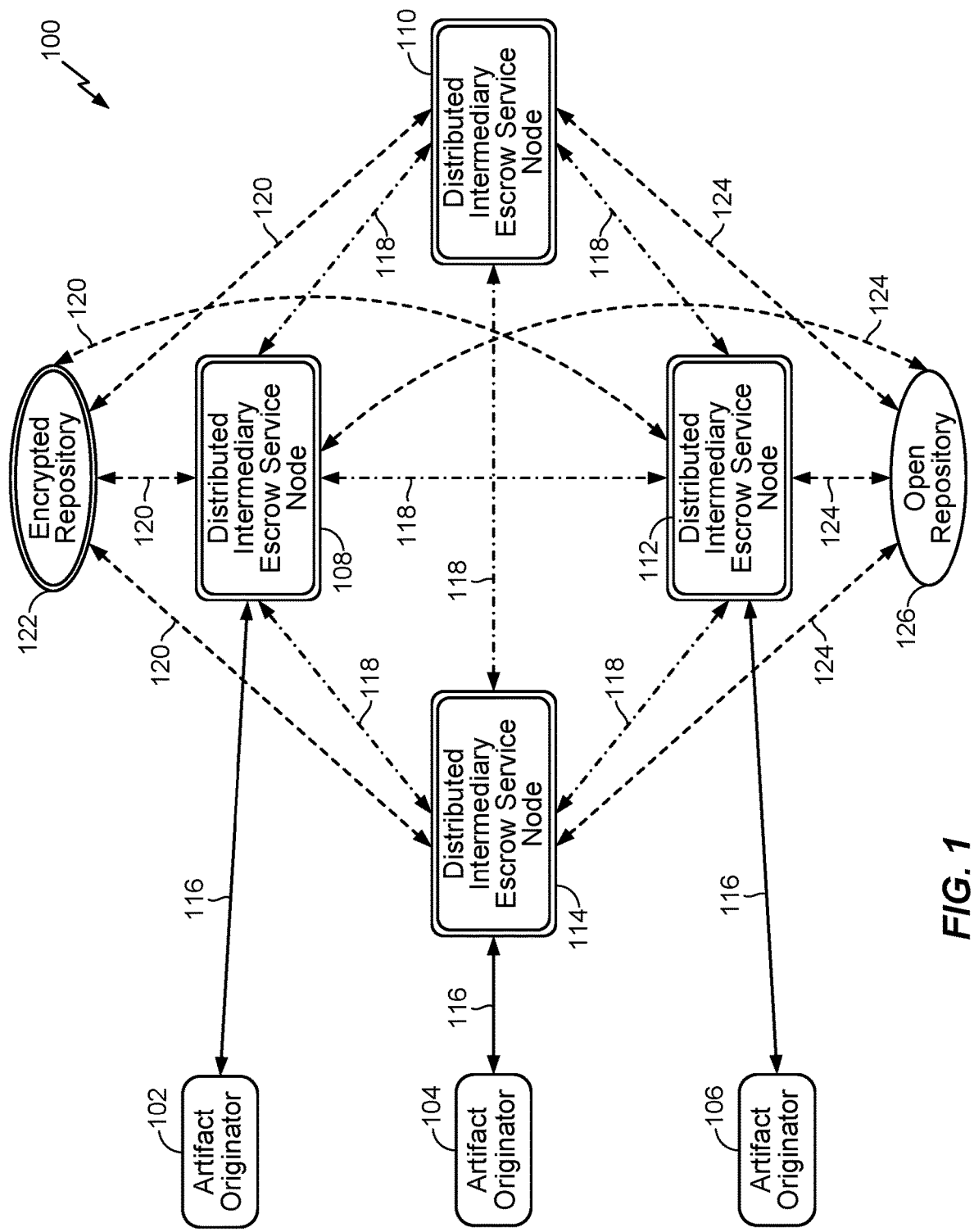
FIG. 1 is a schematic diagram illustrating features associated with an implementation of an example operating environment for blockchain infrastructure for securing and/or managing electronic artifacts.

Reference is made in the following detailed description to accompanying drawings, which form a part hereof, wherein like numerals may designate like parts throughout that are corresponding and/or analogous. It will be appreciated that the figures have not necessarily been drawn to scale, such as for simplicity and/or clarity of illustration. For example, dimensions of some aspects may be exaggerated relative to others, one or more aspects, properties, etc. may be omitted, such as for ease of discussion, or the like. Further, it is to be understood that other embodiments may be utilized. Furthermore, structural and/or other changes may be made without departing from claimed subject matter. References throughout this specification to "claimed subject matter" refer to subject matter intended to be covered by one or more claims, or any portion thereof, and are not necessarily intended to refer to a complete claim set, to a particular combination of claim sets (e.g., method claims, apparatus claims, etc.), or to a particular claim. It should also be noted that directions and/or references, for example, such as up, down, top, bottom, and so on, may be used to facilitate discussion of drawings and are not intended to restrict application of claimed subject matter. Therefore, the following detailed description is not to be taken to limit claimed subject matter and/or equivalents.

DETAILED DESCRIPTION

References throughout this specification to one implementation, an implementation, one embodiment, an embodiment, and/or the like means that a particular feature, structure, characteristic, and/or the like described in relation to a particular implementation and/or embodiment is included in at least one implementation and/or embodiment of claimed subject matter. Thus, appearances of such phrases, for example, in various places throughout this specification are not necessarily intended to refer to the same implementation and/or embodiment or to any one particular implementation and/or embodiment. Furthermore, it is to be understood that particular features, structures, characteristics, and/or the like described are capable of being combined in various ways in one or more implementations and/or embodiments and, therefore, are within intended claim scope. In general, of course, as has always been the case for the specification of a patent application, these and other issues have a potential to vary in a particular context of usage. In other words, throughout the disclosure, particular context of description and/or usage provides helpful guidance regarding reasonable inferences to be drawn; however, likewise, "in this context" in general without further qualification refers at least to the context of the present patent application.

Some example methods, apparatuses, and/or articles of manufacture are disclosed herein that may be used, in whole or in part, to facilitate and/or support one or more operations and/or techniques for blockchain infrastructure for securing and/or managing electronic artifacts, such as implemented in connection with one or more computing and/or communication networks and/or protocols (e.g., network protocols) discussed herein, for example. In this context, "electronic artifact" or simply "artifact" refers to any suitable electronic content, such as human- and/or computer-readable code and/or instructions stored in the form of electronic signals and/or physical states, such as memory states, for example, and descriptive of any function, architecture, design, etc. of software, firmware, and/or hardware, associated service (e.g., an escrow service, etc.), or any combination thereof. To illustrate, an electronic artifact may comprise, for example, one or more data files, executable modules, test plans, images, compilers, related documentation, or the like used, in whole or in part, for developing and/or implementing particular software, firmware, and/or hardware, associated service (e.g., an escrow service, etc.) or any combination thereof. Thus, a totality of artifacts may, for example, be necessary or otherwise useful so as to recreate, maintain, debug, and/or deploy an entire artifact along with its associated functionality at the time the artifact was created. Accordingly, in some instances, an artifact may include, for example, boot firmware all the way to one or more application libraries, compilers and/or loaders, operating systems, debuggers, etc., as well as patches to bring them up to date with the current version of the artifact.

"Electronic content," "content," as the terms used herein, should be interpreted broadly and refers to signals, such signal packets, for example, and/or states, such as physical states on a memory device, for example, but otherwise is employed in a manner irrespective of format, such as any expression, representation, realization, and/or communication, for example. Content may comprise, for example, any information, knowledge, and/or experience, such as, again, in the form of signals and/or states, physical or otherwise. In this context, "electronic" or "on-line" content refers to content in a form that although not necessarily capable of being perceived by a human, (e.g., via human senses, etc.) may nonetheless be transformed into a form capable of being so perceived, such as visually, haptically, and/or audibly, for example. Non-limiting examples may include text, audio, images, video, combinations, or the like. Thus, content may be stored and/or transmitted electronically, such as before or after being perceived by human senses. In general, it may be understood that electronic and/or on-line content may be intended to be referenced in a particular discussion, although in the particular context, the term "content" may be employed for ease of discussion. Specific examples of content may include, for example, an e-mail message, text message, audio file, video file, data file, web page, or the like. Claimed subject matter is not intended to be limited to these particular examples, of course.

As will be seen, one or more approaches for securing and/or managing electronic artifacts may, for example, be implemented, in whole or in part, using distributed ledger technology and/or infrastructure, such as one or more blockchains and/or variants of blockchains. As used herein, a "blockchain" refers to one or more content or data structures, such as in the form of a read-and-add-only distributed ledger, for example, having a number of serially ordered, back-linked blocks of validated electronic or on-line transactions that may be widely copied to who may need to read from or write to it. A "block" is typically a container-type content or data structure that aggregates a list of electronic transactions and references—or "links" back—to a previous block in a chain, also called a "parent" block, via an effectively mathematically unique digital fingerprint of an previous block or so-called block "hash." As such, in a blockchain, each block contains a hash of its parent block, thus, linking blocks in the chain via a sequence of hashes all the way to the very first block or so-called "genesis" block. Because a current block's hash incorporates and, thus, affects a previous block's hash in a blockchain, changing or modifying a parent block would modify a hash of its child's block. In turn, changing or modifying a child block would modify a hash of a grandchild's block and so on. Such a structure may, for example, ensure that, once a block has a larger or otherwise sufficient number of subsequent or next generation blocks, the block may be difficult to modify due, at least in part, to an expensive effort involving re-computations of all previous blocks. As such, if an existing block in a blockchain is changed, then subsequent blocks must be recomputed, at a considerable computational cost. Therefore, older blocks age to become accepted transaction history, and, as such, more secure as a result.

In this context, an "electronic transaction," "on-line transaction," or simply "transaction" may be used interchangeably and is typically a signed content or data structure indicating an agreement, communication, recordation, or some other electronic event. For example, a transaction may comprise a transfer of value (e.g., a digital currency, etc.), transfer of assets and/or rights (e.g., real estate property, etc.), confirmation of an identity (e.g., authentication, etc.), confirmation of access rights to a resource and/or function (e.g., authorization, etc.), process of registering an event (e.g., registration, etc.), recordation of a communication and/or event (e.g., of a status-check message, acknowledgement, etc.), assignment of available resources to one or more devices (e.g., resource allocation, etc.), assignment of a responsibility and/or authority to another device (e.g., delegation, etc.), or the like. A transaction may, for example, be signed via any suitable digital signature, such as via a public key, private key, or the like, or any combination thereof. At times, a transaction may reference a previous transaction's output as new transaction input, for example, and may assign one or more input values to new output. A transaction may or may not be encrypted, in whole or in part. Particular examples of various transactions will be discussed in greater detail below.

Further, one or more transactions within a block may, for example, be validated by a particular type of network node, known as a mining node or "miner," such as by finding a correct solution to a mathematical problem or puzzle via repeated cryptographic hashing operations, which may include, for example, a secure randomized distributed election of a miner node to be allowed to write a next block. Thus, as used herein, blockchain "mining" or simply "mining" refers to a process of validating a block of electronic transactions by a mining node or "miner," such as for inclusion in a blockchain, for example, via solving a blockchain problem or puzzle, secure randomized distributed election process, etc., which may qualify the mining node or miner for a reward and/or appropriate fee. In this context, the terms "mining node" and "miner" may be used interchangeably and refer to a network node, which may comprise a storage node, for example, capable of solving a blockchain problem or puzzle via one or more cryptographic hashing operations. A form of consensus algorithm or approach used to decide that a block is a valid candidate for addition to a blockchain may, for example, depend, at least in part, on blockchain design tradeoffs. For example, in some instances, such as to implement one or more operations and/or techniques for blockchain infrastructure for securing and/or managing electronic artifacts, a proof-of-work-type consensus algorithm or rule may be used, in whole or in part, though claimed subject matter is not so limited.

At times, a proof-of-stake-type process or approach may, for example, be employed, in whole or in part, such as via levying against disincentives to prevent or lessen improper miner behavior. At other times, one or more algorithmically randomized verifiers may, for example, be employed, at least in part, to select an ephemeral subgroup of miner nodes, such as to verify one or more applicable transactions and/or write a next block (e.g., Algorand or the like). Again, claim subject matter is not limited to a particular algorithm or approach. To solve a puzzle, a miner may typically, although not necessarily, compete with other miners on a network, such as by generating fixed-length hashes by repeatedly trying to vary an output of a hash until a resulting hash matches specific requirements. Having solved a blockchain puzzle, a miner may be rewarded in some manner, such as with digital currency, for example, and may record its validated block of electronic transactions in a blockchain. At times, to be included in a blockchain, a validated block may also be verified or confirmed, such as by other miners on a network to ensure that the block complies with consensus rules (e.g., includes a correct solution to a puzzle, has a syntactically valid structure, etc.), network-wide or otherwise.

In some instances, blockchain mining may, for example, be implemented, at least in part, via a mining service, such as, for example, a third-party and/or external mining service, though claimed subject matter is not so limited. For example, at times, a particular entity, such as an escrow service provider, just to illustrate one possible implementation, may provide its own mining services, if suitable. However, it should be noted that distribution of artifacts more widely, such as across a plurality of network nodes (e.g., cloud data centers, multiple clouds, etc.) so as to facilitate and/or support artifact survivability, for example, including that of the nodes themselves, may be a desirable goal. Thus, at times, a mining process may, for example, be similar to a single point of validation and/or consensus approach among a plurality of miner nodes comprising full blockchain repositories. In some instances, miners, external or otherwise, may mine and/or execute transactions "blindly," such as without substantive knowledge with respect to details of a particular transaction, for example, such as by simply confirming that a particular transaction belongs in a block and/or blockchain of interest.

In an implementation, as will also be seen, in addition to a so-called "main" blockchain, one or more additional blockchains, such as so-called "sidechain" blockchains may, for example, be employed. In this context, a "main" blockchain refers to an original or "parent" blockchain, and a "sidechain" blockchain or simply "sidechain" refers to a separate or "child" blockchain that is interoperable (e.g., paired, linked, attached, etc.) with the parent blockchain. For example, a sidechain may be interoperable or linked with a main blockchain via a one-way or two-way communication, such as to facilitate and/or support a transfer of value, assets, rights, etc., recordation or transactions, or the like, such as instead of or in addition to implementing one or more applicable operations, actions, etc. Thus, in some instances, a sidechain may, for example, be viewed as ancillary storage. It should be noted that a main blockchain and any sidechains may or may not use the same consensus algorithms, which may depend, at least in part, on a particular network, infrastructure, transactions, service, implementation, or the like. At times, a main blockchain and one or more sidechains may, for example, be maintained on full network nodes as part of blockchain infrastructure, but, in some instances, such infrastructure may be implemented, in whole or in part, across multiple (e.g., commercial, etc.) cloud services so as to provide resiliency and/or security against cloud provider failures as well as artifact and/or escrow service providers. It should be noted that, in an implementations in which a main blockchain and one or more sidechains are employed, it may take time for the main blockchain and one or more sidechains to settle due, at least in part, to a larger scale distribution, but, in many cases, this may be acceptable as long as a convergence time is substantially less than a duration of a contact validity window, as also discussed below.

Thus, depending on an implementation, a mining node or miner may comprise, for example, a full node, a lightweight node, or any combination thereof. In this context, a "full node" refers to a network node capable of facilitating and/or supporting all or most processes for blockchain mining. For example, a full node may be capable of finding a valid proof of work, network routing, providing wallet services, maintaining a full copy of a blockchain in its memory, verify and/or propagate transactions, enforce consensus rules, or the like. A "lightweight node," as the term used herein, refers to any mining node other than a full node. For example, a lightweight node may be capable of finding a valid proof of work for a block of on-line transactions and/or communicating block-related updates for inclusion in a blockchain, but may not be capable of maintaining a full copy of a blockchain in its memory, such as due, at least in part, to memory constraints, as one possible example. Thus, in some instances, a lightweight node may, for example, rely on one or more other nodes (e.g., other lightweight nodes, full nodes, server devices on a network, etc.), such as for transaction verifications, block validations, etc.

Also depending on an implementation, a blockchain, main or otherwise, may comprise, for example, a public blockchain, a private blockchain, or any combination thereof. In this context, "public" blockchain refers to a blockchain with an unrestricted and/or permissionless access, and "private" blockchain refers to a blockchain with a restricted and/or permissioned access. Access may, for example, be restricted and/or permissioned with respect to one or more blockchain-related aspects, such as blockchain viewing, block recording, block aggregation, block validation, transaction verification, transaction propagation, consensus and/or participation, or the like. In at least one implementation, on-line transactions may, for example, be aggregated into a candidate block by mining nodes independently, such as by accessing an applicable transaction pool, cached or otherwise. In some instances, on-line transactions may, for example, be aggregated into a candidate block by a particular mining node, such as a node that successfully solved a previous block of transactions. At times, on-line transactions may, for example, be aggregated into a candidate block by an applicable service provider or any other suitable party (e.g., a third-party mining service, etc.) and may be broadcasted to a network for validation (e.g., as a candidate block, etc.).

As alluded to previously, in some instances, certain electronic devices may, for example, be "orphaned," such as if entities (e.g., companies, organizations, etc.) that developed the devices and/or artifacts for such devices go out of business, wither away to such an extent that the entities no longer have skills, desire, ability, etc. to update and/or maintain the artifacts. Without appropriate updates, these or like electronic devices may, for example, become a liability to their owners, as was also indicated. For example, lack of access to an artifact, such as for the purposes of updating an electronic device, among others, may endanger secure and/or stable functioning of the device and/or associated infrastructure or even the lives of those dependent upon their use. At times, enabling access to an artifact may be particularly important and/or useful for electronic devices with longer lifecycles, such as IoT devices, for example, since these devices may be expected and—in some instances, even required—to perform and/or be deployed for many years (e.g., more than 20, 30, etc. years). With the proliferation of electronic devices, including IoT devices, the importance of providing access to associated artifacts, such as for securing and/or managing these or like devices throughout their lifecycles, for example, in order to facilitate and/or support market stability, device security, consumer confidence, etc., cannot be overstated.

To address these or like issues, in some instances, an escrow service may, for example, be employed, at least in part, so as to facilitate and/or support appropriate storage of an artifact in an escrow account, which may be held by a trusted third party, such as an escrow agent. For example, a company purchasing and/or operating a particular electronic device may require an originator of an associated artifact to store the artifact, such as a source code, related documentation, etc. in an escrow account. In some instances, via such an arrangement, a stored artifact may, for example be released by an escrow agent to a purchasing company upon occurrence of some "release event," such as an originator filing for bankruptcy, failing certain escrow conditions, contractual obligations, or the like. However, a centralized storage mechanism, such as an escrow account, for example, albeit relatively trustworthy, may be susceptible to malicious attacks and/or single point of failure. Here, possible issues may include, for example, a number of security compromises of a central repository capturing stored artifacts and/or possibly keying material used to protect an escrow account. At times, a centralized storage mechanism may, for example, also become a "bottleneck" potentially diminishing or precluding timely access to an artifact and, thus, limiting its availability. A centralized storage mechanism may also lack redundancy, scalability, and/or robustness, for example, and, as such, may have little or no resiliency against tampering, escrow service and/or node failure, or the like. To illustrate, an escrow agent constructed on such a service may itself go bankrupt, for example, but may still be responsible for an artifact it holds, which may make unraveling of applicable obligations even more complicated. Accordingly, it may be desirable to develop one or more methods, systems, and/or apparatuses that may implement blockchain infrastructure capable of securing and/or managing electronic artifacts, for example, so as to facilitate and/or support their survivability, provide secure and/or timely access to such artifacts, or the like, such as throughout a lifecycle of applicable electronic devices, which may include long-lived IoT devices.

Thus, as will be described in greater detail below, in an implementation, blockchain infrastructure, which may include secure distributed ledger technology employing one or more blockchains and/or variants of blockchains, for example, may be constructed. Such infrastructure may, for example, be capable of storing and/or providing appropriate access to electronic artifacts and, as such, may facilitate and/or support a more secure operation and/or management of applicable electronic devices throughout their lifecycles, among other things. As will also be seen, in some instances, a process for securing and/or managing electronic artifacts, such as utilizing constructed blockchain infrastructure, for example, may be implemented via a number of operational phases. By way of example but not limitation, operational phases may include an Initialization phase, Encoding and Distribution phase, Status Checks phase, and Release phase, though claimed subject matter is not so limited. Initially, an artifact may, for example, be reduced or partitioned into a set of slices or so-called artifact "shards," such as for the purpose of securely and/or resiliently scattering among a number of physically and/or mathematically distinct network repository nodes, which may include peering nodes. As used herein, an artifact "shard" or simply "shard" refers to a slice or partition of content or data that comprises the artifact, such as in any suitable manner. For example, artifact shards within a particular set may vary in size, content, number, etc. In some instances, artifact shards may, for example, be mathematically encoded, such as to optimize secure protection and/or distribution resiliency of artifacts. Particular examples of artifact partitioning or "sharding" will be discussed in greater detail below.

Thus, via scattering artifact shards among appropriate network nodes, a distributed artifact registry may, for example, be created and used, in whole or in part, in connection with implementing one or more contractually-specified actions, as also discussed below. Based, at least in part, on these actions, stored artifact shards may, for example, be reconstituted in a suitable manner, such as to convert the shards into an artifact. A reconstituted artifact may, for example, be released, such as under new ownership constraints that may include options for artifact transfer (e.g., via a reassigned license, etc.) to a new entity (e.g., to a partner, creditor, etc.) and/or open source renditions, as will also be seen. One or more transactions associated with securing and/or managing electronic artifacts may, for example, be recorded in one or more blockchains, such as to prevent or reduce tampering. As such, construction and/or use of blockchain infrastructure, which may include secure distributed ledger technology employing one or more blockchains and/or variants of blockchains, for example, may provide a service that may be resilient not only to the failure of an originator of artifacts, but also to the failure of a service itself, meaning that, at times, the service itself may be treated as an artifact.

With this in mind, attention is drawn to FIG. 1, which is a schematic diagram illustrating features associated with an implementation of an example operating environment 100 that may be used, in whole or in part, to facilitate and/or support one or more operations and/or techniques for blockchain infrastructure for securing and/or managing electronic artifacts. As seen, example operating environment 100 may comprise, for example, a number of artifact originators, such as entities (e.g., vendors, companies, etc.) that have developed firmware and/or software needed and/or useful to maintain and/or operate associated electronic devices. As a way of illustration, for this particular implementation, artifact originators may include, for example, an Artifact Originator A, referenced at 102, an Artifact Originator B, referenced at 104, and an Artifact Originator C, referenced at 106. In general, it may be understood that artifact originators may be intended to be referenced in a particular discussion, although in a particular context, the term "originator" may be employed, such as for ease of discussion. It should be noted that, even though a certain number of artifact originators, as well as networks, systems, repositories, features, nodes, links, etc. are illustrated herein, any number of suitable artifact originators, networks, systems, repositories, features, nodes, links, etc. may be implemented. Also, depending on an implementation and/or context, a double-sided and/or single-sided arrow, if shown, may, for example, indicate a unidirectional flow, a bi-directional flow, or any combination thereof, such as with respect to signals, operations, processes, communications, etc. that may comprise and/or be represented via one or more digital signals, as was indicated.

According to an implementation, as referenced generally via one or more communication links at 116, Artifact Originators 102, 104, and/or 106 may, for example, be capable of communicating with one or more network nodes, such as Distributed Intermediary Escrow Service nodes 108, 110, 112, and 114. For example, Artifact Originators 102, 104, and/or 106 may electronically contact any suitable Distributed Intermediary Escrow Service node, such as for the purposes of checking in and/or proving originator's viability under contractual terms and/or conditions for storing and/or maintaining an artifact in an associated escrow account, as will be discussed in greater detail below. As was indicated, an artifact may, for example, be stored in escrow so as to fulfill some mutually agreed-upon commitment as part of purchasing, selling, lending, maintaining, etc. an applicable electronic device. As will also be seen, in some instances, a contract between applicable parties may, for example, be negotiated upon submission of an artifact by an originator to a suitable escrow service, just to illustrate one possible implementation. Such a contract may include, for example, one or more terms and/or conditions relating to an event that may trigger a release of an artifact, as well as where it is to be released, a schedule for release, including a waiting period, the ability to reclaim an artifact prior to release, or the like. At times, a contract may also reflect one or more jurisdictional requirements, for example, and may include a type of license, such as if open-source license is allowed, if applicable. In some instances, a license type may specify a closed source license held by a designated party may also be an option, for example, since it may reflect business partnerships that may transfer ownership (e.g., automatically, etc.), including in case of default.

In an implementation, a particular network node, such as Distributed Intermediary Escrow Service node 114, for this example, may split or partition an artifact of interest into a number of shards of various sizes using one or more appropriate techniques discussed below, and may distribute the shards over a network overlay, such as Distributed Intermediary Escrow Service nodes 108, 112, and 110 for secure storage, as illustrated generally at 118. For example, as one approach, multiple copies of an entire artifact may be made and distributed to a number of network nodes (e.g., Distributed Intermediary Escrow Service nodes 108, 112, 110, etc.). Here, it may, for example, be useful for an applicable network node to have an amount of storage at least equal to a number of artifact copies times the size of each copy. Such a network node may, for example, also manage one or more appropriate keys, such as for decrypting an artifact, if applicable.

As another possible approach, in some instances, one or more erasure coding techniques or approaches may, for example, be used, at least in part, or otherwise considered, such as for the purposes of partitioning and/or distributing an artifact. For purposes of explanation, an erasure code may, for example, process content or data comprising an artifact, such as a set of binary symbols, as one possible example, may embed them in a larger set of such symbols, including redundant information, and may use this encoding to detect and/or reconstruct the artifact even in the midst of various kinds of corruption. Here, any suitable erasure code capable of facilitating and/or supporting one or more operations and/or techniques discussed herein may be used, in whole or in part, or otherwise considered. For example, choosing an erasure code resilient against various kinds of failures, including power grid losses at a given network node location and/or a number of locations, while complementing the ephemeral and/or untrustworthy nature of network nodes, which may be expected to randomly appear and/or disappear, may prove beneficial. By way of example but not limitation, here, utilization of one or more All-or-Nothing Reed-Solomon erasure codes (AONT-RS) may, for example, prove beneficial, though claimed subject matter is not so limited, of course.

Thus, in some instances, erasure coding may, for example, facilitate and/or support more efficient and/or more effective replication of just enough content (e.g., a number of shards, etc.) that, if some distributed network node repositories are lost (e.g., Distributed Intermediary Escrow Service node 114, etc.), then some subset of the remaining ones (e.g., Distributed Intermediary Escrow Service nodes 108, 110, and 112, etc.) may be sufficient to recover the content (e.g., an artifact, smart contract, service contract, etc.). To illustrate, for this particular example, an artifact of interest may be distributed via shards to Distributed Intermediary Escrow Service nodes 108, 110, 112, and 114 such that the artifact may be reconstructed if a sufficient number of shards from Distributed Intermediary Escrow Service nodes 108, 110, and 112 are combined together, while individual shards stored on Distributed Intermediary Escrow Service nodes 108, 110, 112, and 114 may be of no use on their own. Claimed subject matter is not limited to particular nodes, combinations, shards, etc., of course. As such, in some instances, erasure coding may, for example, facilitate and/or support resiliency through distribution, particularly since an escrowed artifact may typically be encoded and decoded once and may not necessarily require an encryption key, but is likely to be stored for relatively longer periods of time.

In an implementation, upon some release event, such as if a decision to change an ownership of a stored artifact is made, which may be based, at least in part, on failure to fulfill some mutually agreed upon contractual commitment monitored by a set of watchdog timer events, for example, the artifact may be reconstituted. For example, a creator, owner, etc. of a particular artifact, such as Artifact Originator 102, 104, and/or 106 may be contractually obligated to regularly and/or timely prove their continuing existence, such as by regular check-ins via one or more electronic communications 116, which may be in the form of status-check messages. Thus, at times, an absence of one or more status-check messages, for example, may comprise such a release event, also discussed below. Here, it may be useful to employ a suitable resend protocol, such as to more definitively and/or more securely detect an absence of one or more status-check messages. As one possible approach, a randomized request for a new status-check message may, for example, be sent to an applicable artifact originator a predetermined number of times over an extended time period, at random times, within predefined messaging windows of known duration before taking some action, etc., such as before making a decision to reconstitute an artifact. In some instances, an artifact originator (e.g., Artifact Originator 102, etc.) may, for example, be contractually obligated to prove their viability, such as by some predetermined and/or predefined action, which may include solving a puzzle representative of the necessary skill set applicable to a particular artifact. For example, a puzzle may involve providing a verification, which may be automatically executed, describing the purpose of a particular code fragment in an artifact known only to an artifact originator (e.g., owner, creator, etc.). If an artifact originator fails to do so, then artifact shards may be reconstituted, such as via communication links 108, for this example, and/or licensing documentation, such as, for example, one or more file headers, licensing agreements, etc. assigned to the originator may be reassigned to some new entity.

In some instances, such as if a new entity has taken over assets of an original owner by acquisition, through bankruptcy action, etc., for example, then one or more software files and/or other applicable content for an artifact of interest may be modified in a suitable manner (e.g., automatically, etc.), such as to reflect the new ownership. As illustrated generally via one or more communication links 120, at times, these or like files, content, etc. may, for example, be placed into an Encrypted Repository, referenced generally at 122, if applicable, and an escrow process may be re-initialized. At times, such as if no new owner is proven, then one or more software files, content, etc. may, for example, be modified to become a form of open sourced software. In such a case, one or more software files, content, etc. comprising an artifact may, for example, be communicated for publication, such as via communication links 124, as one possible implementation, to some open source repository, referenced generally herein as Open Repository at 126. In this manner, even if an original company that created a product fails, a successor entity, which may include an open source entity, may take over maintenance, repair, enhancement, etc. of that product, in whole or in part, such as under terms of a reassigned license, for example.

In an implementation, a conversion of an artifact from closed source to open source, or somewhere between different open source or closed source options, may vary depending on one or more other constraints, such as, for example, different regions into which the artifact may be released, what may be allowed or disallowed to be released (e.g., countries under export control, etc.), or the like. These or like restrictions may reflect not just legal terms of an associated software license, for example, but a location of one or more servers to which an artifact may be released. At times, these or like restrictions, conditions, terms, etc. may, for example, be translated into a machine readable "smart contract" that may be placed into a variant of a blockchain, such as a sidechain linked to a main blockchain if it contains check-in events, or to a check-in log, if kept separate. In this context, "smart contract" refers to automated executable computer code and/or instructions capable of enforcing performance of an agreement, such as via one or more rules. Thus, in some instances, a smart contract may comprise, for example, rules and content to parameterize them. Rules may, for example, capture behaviors to be executed by computer programs upon computer-readable code stored on a particular network node (e.g., Distributed Intermediary Escrow Service nodes 108, 110, and/or 112, etc.). Rules may also limit one or more actions that may be taken to change and/or otherwise modify a particular structure of a network (e.g., code graphs, etc.). Rules may be specified as part of an escrow contract negotiation process, for example, and may be "well ordered," such as enforced in a listed order.

By way of example but not limitation, a contact rule may specify a time period as well as one or more window parameters to control a default frequency and duration within which contact must be made between an originator and a particular node of an escrow service in order to maintain an artifact in escrow, such as via one or more status-check messages. It should be noted that it may be useful to specify, for example, that a status-check message may arrive at any applicable network node within a time window centered around a predefined time period since the last message. This randomization may be used to avoid packet collisions and/or to make infrastructure harder to attack, such as with denial of service traffic flooding, for example. A number and/or overall timing before a sequence of expected status-check messages fails to be received may, for example, be parameterized in any suitable manner (e.g. 5 status-check messages over 10 days, etc.). Again, particular examples of status-check messages, sequences, processes, etc. will be discussed below with reference to FIG. 2.

In some instances, one or more jurisdictional rules may also apply, which may vary one or more parameters of smart contracts. For example, jurisdictional rules may determine where network nodes must be located for closed and/or open source code. At times, there may also be regulations governing permitted licenses and/or terms in a given jurisdiction. For example, a country may regulate types of licenses that are permitted to be used within its borders. These or like rules may, for example, limit transformations that are allowed in such a way that upon triggering a release multiple conversions per jurisdiction are performed on the same closed source files, or even on different closed source files in different jurisdictions. These or like permutations may also be expressed in rules of a smart contract, for example, and may be executed appropriate to a particular license or combination of licenses, source jurisdictions and/or destination jurisdictions, or the like. Thus, it may be useful for one or more repository servers to have trusted labels describing a particular jurisdiction in which they operate. In some instances, it may also be useful for an escrow service releasing an artifact to be able to accurately infer a release location and/or applicable server (e.g., via DNS-Sec information, GPS-type sensing, etc.).

This, in an implementation, one or more terms and/or conditions of a smart contract may, for example, be recorded and/or pre-programmed in a computer language as a set of computer-readable code and/or instructions with the ability to self-execute so as to enforce contractual guarantees as part of a particular transaction. For example, executable computer code and/or instructions of a smart contract may run as part of an authorization transaction confirming an identity of an originator, in which data of the transaction may be linked to the code and/or instructions and may be invoked while the transaction is validated in a blockchain. As such, in some instances, a smart contract may, for example, be considered an extension of authorization functionality. At times, a smart contract may, for example, be implemented, at least in part, in a sidechain linked to a main blockchain, where the sidechain may hold code and/or instructions that may be dependent on the transaction data contained in the main blockchain. Here, sidechain storage of smart contracts may be distributed in a manner similar to one or more distributed slices of an artifact, such as via sharding and/or encrypting it onto distributed non-local repositories, for example.

In some instances, one or more operations and/or techniques for blockchain infrastructure for securing and/or managing electronic artifacts, such as, for example, registering, securely archiving, tracking responsible parties, releasing held artifact, etc. may be structured to be machine automatable, which may be specified via one or more contract rules (e.g., may define a type of release, such as automatic, not automatic, etc.). In certain jurisdictions, such as those where artifact conversions and/or reassignments are legally recognized, for example, an ownership of software may essentially comprise a license that may protect endpoint consumers from an orphaned artifact. In other jurisdictions, an approach may be modified in a suitable manner, such as, for example, to trigger one or more actions consistent with national and/or local policies, as applicable, with technological aspects are relatively unchanged. Moreover, protections of copyright law, such as for a source code, for example, may remain in force and/or may be supplemented by one or more additional protections and/or transfer mechanisms as part of an escrow service. Moreover, some jurisdictions may, for example, regulate artifacts' so-called "right to repair" rules applied to software, such that relevant products in a particular jurisdiction may be required to contract with a particular escrow service, which may usually involve a full instantiation of an artifact.

Thus, as illustrated, example operating environment 100 may, for example, facilitate and/or support appropriate access to an artifact so as to keep associated electronic devices operating more securely, more safely, etc. Here, appropriate content useful to maintain and/or update an artifact may, for example, be stored on a limited number of storage nodes on a network. Service metadata and/or indices, such as to deploy an escrow service for a number of originators may, for example, be stored across all or most storage nodes. By way of example but not limitation, some examples of content, such as corresponding to particular storage node as well as storage mechanism are illustrated in Table 1 below.

TABLE 1

Example content with corresponding storage type and mechanism.

| Content | Storage type | Storage mechanism |
| --- | --- | --- |
| Artifact | Local slices, main blockchain | Erasure encoded, encrypted |
| Metadata | Main blockchain | Encrypted, open parameters |
| Smart contract | Sidechain | Encrypted, open templates |
| Check-in event | Sidechain | Open |

As seen, in an implementation, local slices or shards of an artifact, such as sets of copies of software, firmware, hardware designs, documentation, tools, etc. for operating and/or maintaining an electronic device, as previously discussed, may, for example, be stored in a main blockchain and may be erasure encoded and/or encrypted, such as via one or more appropriate techniques, as also discussed herein. As was indicated, at times, erasure coding may, for example, be used, in whole or in part, to more safely and/or more resiliently scatter shards of an artifact among a set of physically and/or mathematically distinct peering repository nodes, which may themselves comprise conventional block storage, optionally encrypted for double protection, or structured as one or more blockchains. As also seen, in some instances, metadata may also be stored in a global blockchain, for example, and may be encrypted, but may also include an option of being publically accessible (e.g., via open parameters, etc.). Metadata about stored artifacts in escrow may typically govern its authorized use and/or conversions so as to support distributed shards of an artifact among a subset of repository network nodes (e.g., Distributed Intermediary Escrow Service nodes 108, 110, 112, 114, etc.).

Depending on an implementation, a process for securing and/or managing electronic artifacts may be allowed to be relatively high latency, since reconstitution of an artifact and/or a decision about its release are generally not time critical. In some instances, a typical code escrow entry may comprise, for example, a text blob, such as without any metadata beyond giving it a name, an owner and a version identifier. In this case, there may not be any associated metadata to describe internal properties or even a purpose of associated code, meaning that the blob may effectively be a "black box." In general, there may be various optimizations applied to a blob to describe one or more internal properties, such as to make version control and/or update storage more efficient, for example. Note that a blob may, for example, be at a code block, file, directory, or even object database level, such as without much restriction. In addition, as mentioned earlier, artifact-related code may include, for example, any suitable documentation, configuration files, byte code, tools, build scripts, license files, and/or other suitable content associated with production and/or maintenance of runtime binaries from source. It may also be possible for one or more escrow operations to require or otherwise consider additional metadata that may, for example, be generally kept outside of a blob.

For example, depending on an implementation, such metadata may include a software name, version identifier, manifest of included files and/or objects necessary or useful to build a system, how often an artifact originator is obligated to contact an escrow service to maintain the escrow, any potential shared secrets for a given software release decryption, current closed source license, required (e.g., by regulation, etc.) or preferred (e.g., by originator, etc.), license assignee and/or type (e.g., whether closed source, or to another entity, or open source, or both, etc.), open source repositories to hold a release, or the like. For escrow service contracts, metadata may include, for example, one or more provisions to cover terms and/or conditions for maintaining artifacts in their current state (e.g., typically governing check-in frequency and/or number of allowed misses, etc.), particulars of a conversion process leading to a release of an artifact, or the like.

Thus, generally, according to one or more implementations, consider, for example, the following with respect to metadata:

Source code may be structured in a directed acyclic graph or similar data structure that may allow ready comparison between graphs for differences and/or membership, as well as versions. Nodes of a graph may reflect directory structures in a filesystem and header and code files. Graphs may reference other graphs.

Graphs may have associated metadata. These may include, for example:

Graph_Name, which denotes a generic label for code independent of version.

Graph_ID, which may be unique to a particular escrowed version of a graph.

Version

Timestamp

OwnerVendor_ID

Nodes may be in the form of blocks of code in a graph. Like graphs, they may have associated metadata. These may include, for example:

Block Name

Node ID

Version, which may be distinct from a graph version.

Timestamp

OwnerVendor_ID

Timestamps may be used to distinguish variants of a given version of software and/or to establish evidence of when a particular submission was made to escrow, as well as when it was released to new ownership. It may be required and/or useful for a time source to be authoritative and/or trusted.

License files may be nodes referenced by other nodes to indicate one or more terms and/or conditions governing their use.

A code blob's Code_Name need not be unique, since it may apply to a family of evolving code blocks.

A code blob may have some form of Code_ID that may be globally unique. It may be constructed from a Code_Name and a Code_Version identifier assigned by an originator and/or vendor. Note that since an Escrow Service may likely have multiple possible code submission points that then rationalize the code blob among themselves, timestamps may be useful to determine which submission transaction to accept as a globally recognized version at a given time.

A code blob may reference other code blobs to form a graph, and that graph may itself be interpreted as a code blob, with its own Code_name, Code_Version and/or Code_ID.

Since artifact code may be sliced into multiple images and distributed to a diverse set of repositories, it may be important or useful for retrieval in case of Release to know where to query for the slices over what may be an unreliable infrastructure of network connections and/or storage servers found in a Slice_Servers_List.

Other metadata may be included to better and/or suitably manage source code files and their distribution.

In some instances, a Services Contract Metadata Template (SCMT) may, for example, be used, in whole or in part, such as represented via any suitable pseudocode. Thus, consider, as an example:

```
SCMT := {
    Vendor_Name -> String;
    Escrow_ID -> String;
    SW_Bundle_Name -> String;
    SW_Description -> String;
    Version -> Int (. Int) * ;
    Ownership_tree - > List of TS'd associations;
```

-continued

```
    Licensing_tree -> List of TS'd associations;
    Maximum_Update_Interval - > Int;
    Licenses -> List of strings;
    Jurisdiction_rules -> List of TS'd location associations;
    Recovery_rules -> List of subcontract actions;
    Release_rules -> List of TS'd associations;
    Rights_rules -> List of TS'd associations;
    Noncompete_rules -> List of IS associations;
    Escrow_rules -> List of IS associations;
}
```

It should be noted that, depending on an implementation, fields in an example template may be combined together as properties of each code module, such as for simplicity. By way of example but not limitation, template fields may include:

Subject Area.

Scope: materials to maintain software including documentation, specialized hardware, assigned licenses, and/or appropriate versions of software tools, such as compilers, debuggers, linkers, operating systems. In effect, this may be a source code tree annotated with additional information, such that the entirety may represent all that is necessary to rebuild a working binary. If build, debug, deployment or some other applicable components are sufficiently well specified, then it may, for example, be possible to automate the build verification, but if custom hardware is assumed (or no longer exists), then software emulation may be required, adding to a complete set of artifacts.

Version:

A template may change; hence, a version number may be used to match behaviors between old and new versions. Version numbers may monotonically increase.

Ownership and Licensing Trees:

Code modules may come from various sources, including open and closed sources, such as under distinct licensing and/or ownership patterns that may change over time.

Update Interval:

Denotes how often an "owner" (e.g., an originator, etc.) may be expected to check in to confirm ownership rights. Failure to check in may trigger a set of actions to reestablish contact with the owner by an escrow service and/or potentially establish a consensus among multiple "authorization agents" that ownership is still valid, but other infrastructure complications may be interfering with confirmation/acknowledgement messages. If ownership is reconfirmed, a receipt may be issued to the owner and/or may be published for notice (e.g., in a cloud record, etc.).

Default Interval for Remediation:

A time interval between first failed contact and final contact attempt, after which ownership transfer events may proceed.

Licensing Tree:

A licensing tree may mirror a software dependency tree and/or may include closed as well as open source modules' and libraries' licenses.

Jurisdiction:

Local applicable laws may generally be determined by jurisdiction. This field may list those locations paired with a module, effectively a parallel data structure along with a licensing tree at a given timestamp (e.g., since regulations at the time of release may also change over a lifetime of software and/or whether those regulatory changes may be applicable may also depend on jurisdiction). This may be important in bankruptcy, transferable licenses, copyright transfers, or the like.

Conditions for Release:

May include international markets and/or rules, as applicable, complete ownership chain including creditors and/or liens, other terms under which authors/owners may relinquish their ownership.

Rights Obtained Under Transfer by an Escrow Agent:

An escrow agent may have no right to modify ownership of files not owned by a transferring owner that were licensed from other entities or that were shared under a specific open source license.

Non-Compete Clauses:

May be applicable in different jurisdictions and/or may be optional.

Critical personnel points of contact given change of control.

Escrow agent responsibilities/services.

Contractual transformation.

Smart Contract Actions Applied to a Template:

It may be useful if an event is not triggered solely upon an absence of communication. Instead, it may be useful to have a random pattern of status-check messages exchanged between an originator/vendor and an escrow service/hosting provider. A rationale for random patterns is that an attacker who manages to get into the middle of message flows is more likely to be detected and would not by default trigger a release event. Another rationale is to deflect denial of service attacks, which may prevent messages from getting through, such as if a particular network is flooded with maliciously injected packets, for example. Most of these messages may contain a simple liveliness/check-in status update. Some may contain new content to add to a repository. Rare messages may come from an originator/vendor to release a version of stored software to another repository under a more open license, such as open source. As was indicated, a status-check message from an escrow service/hosting provider may include, for example, a puzzle representative of the necessary skill set applicable to a particular artifact, such as providing appropriate verification, describing one or more aspects of the artifact known to an originator/vendor of interest, or the like.

Continuing with Table 1, content for a smart contract and/or check-in event may, for example, be stored in a sidechain and, at times, may be encrypted and/or reduced to reusable templates (e.g., open source "fill-in" templates, option for a smart contract, etc.), and/or may be open/publically accessible, such as for a check-in event. An escrow release mechanism may, for example, be stored in one or more copies of a sidechain as a set of computer-readable code and/or instructions (e.g., smart contracts, etc.) that determine satisfaction of a rule governing a conversion of a stored artifact from one owner to another. Note that these contracts may typically be applied to one or more locally aggregated artifact slices, for example, rather than to a main blockchain metadata. Peers of a full function storage node may contain artifact slices and may determine whether a triggering event has occurred, for example. This may, for example, permit applicable nodes to gather and/or decode applicable artifact shards from other member nodes of a subset, as indicated, to invoke any suitable conversions, and/or to release a converted variant of an artifact to a designated release repository (e.g., Encrypted Repository 122, Open Repository 126, etc.). Note that release repositories may be implemented as one or more write-once, read thereafter (e.g., many copies, etc.) sidechains, such as to avoid or reduce tampering, for example, but, in some instances, may also follow storage system models that use hashes of content and/or permit a fewer number of centralized, but backed up, resilient storage nodes, including mirror nodes (e.g., GitHub, etc.).

According to an implementation, participating repository network nodes may, for example, comprise peering nodes capable of communicating with each other directly, such as via peer-to-peer-type communications and/or without being intermediated by some other device and/or process (e.g., a server device, etc.). Thus, at times, Distributed Intermediary Escrow Service nodes 108, 110, 112, and/or 114 may, for example, be connected by a computer network so as to form a random graph acting as coequals in a P2P (peer-to-peer) overlay network. Generally, peers may be assumed to be less reliable or, in some instances, relatively unreliable, due, at least in part, to their ability and/or tendency to join and/or leave a network with little or no restrictions, for example. Such a random graph of peers may be geographically widely scattered, for example, and new peers may be randomly added, such as to form a set of overlay "neighbors," as opposed to link-level neighbors that may be generally relatively nearby physically. Messages may be asynchronously exchanged among overlay peers, as well as between nodes that are neither directly peering nor physical neighbors, for example, but, at times, peers and/or non-peering nodes may rely on other participating peers and/or network nodes as intermediaries. Here, a full-function peer may serve as a contact for client (e.g., originator, etc.) requests for escrow services, for example, including contracts, contact renewals, repository downloads and/or uploads, encoding, decoding, distribution, etc. of artifact shards, or the like. In some instances, there may also be peering nodes that may be capable of implementing a subset of these or like processes, such as lightweight nodes discussed above. Thus, although not shown, in some instances, example operating environment 100 may include, for example, one or more server devices that may be used, in whole or in part, in connection with one or more operations and/or techniques for blockchain infrastructure for securing and/or managing electronic artifacts. These or like server devices may, for example, be addressable from any suitable network node. An overlay network may be partitioned from time to time, for example, but it may be useful for a suitable number of nodes to be richly and/or sufficiently reliably connected.

In an implementation, in example operating environment 100, groups of "neighbors" that are an overlay distance of 1 away from one another may form clusters of bounded size, for example, and may be persistent in the sense that if a member node disconnects and then reconnects some time later, it may still be a member of the same group. Typically, a "coherence time" of a cluster will be adjusted to make it more economical to update from any previously existing state than to recreate it in its entirety, as well as the check-in interval and/or some simple form of resource allocation so that clusters are approximately the same size and/or aggregate capability. As a way of illustration, if an existing state held by a particular node is 10 GB and an update "delta" is 100 MB since the last time the node was actively connected to the cluster was 1 second ago, then the time to synchronize the new state over 10 Gbps links is trivial ($(1/10^10 \text{ bps}) \times (8b/B)(10^8 \text{ B}) \sim 8 \times 10$ ms, but if the entire 10 GB state had to be reproduced it would take 100 times as long, or a full second assuming no other congestion. If, however, a node remains disconnected for too long, it may be replaced with a clone node derived from one or more other members and may be instructed (e.g., by denying it permission to rejoin, etc.) to erase itself and/or reconfigure to join a new group that is being formed, a group that has too few members, etc.

In some instances, a desirable goal may include maintaining an average size of a group of participating nodes above some threshold. By way of example but not limitation, a threshold of an order between 10 and 100 members, but probably less than thousands, may be used or otherwise considered, such as before a compute load and/or network/device reliability over a cluster may introduce issues. Claimed subject matter is not limited to a particular threshold, of course. At times, such a process may, for example, be akin to a kind of load balancing, such as to scale out repositories as new content is added. Note that several new nodes may be initially required or asked to replace a single long departed one, for example, because a given node may contain quite a few distinct artifacts shared with a mix of nodes from one group as well as several other groups.

Depending on an implementation, content that may be distributed over a network within example operating environment 100 may include, for example, slices or shards of an artifact encoded from a source block/file. Generally, it may be less useful to push slices to every node in a network. Instead, at times, a subset of direct but geographically diverse peers, such as network overlay's nearest neighbors, for example, may be used, in whole or in part, to hold encrypted shards. Here, it may, for example, be useful if nodes in an overlay cluster of peers be aware of each other, such as if their locations are made public. Moreover, once a decision and/or request to reconstitute an artifact is made, it may be useful for one or more responsible nodes evaluating the decision and/or request to know where to find artifact shards appropriate to a given content version. Thus, in some instances, content that may be distributed over a network may include, for example, location-related content with respect to shards of an artifact of interest. Such content may be relatively widely and/or publicly distributed, such as via a blockchain or other secure log distributed ledger technologies, for example.

Figure 2:
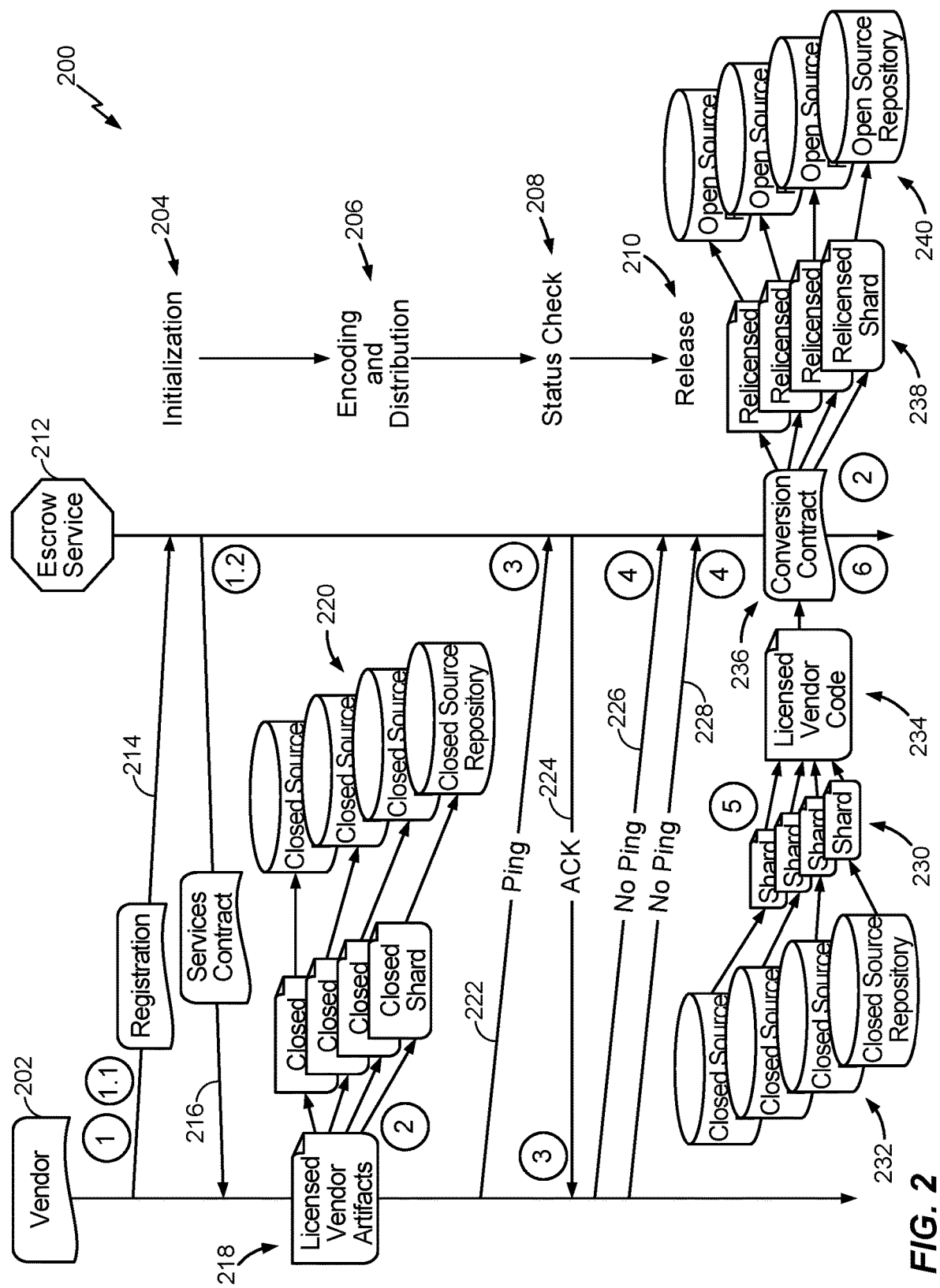
FIG. 2 is a conceptual state diagram illustrating an implementation of an example process for blockchain infrastructure for securing and/or managing electronic artifacts.

With this in mind, attention is now drawn to FIG. 2, which is a conceptual state diagram illustrating an implementation of an example process 200 that may be used, in whole or in part, to facilitate and/or support one or more operations and/or techniques for blockchain infrastructure for securing and/or managing electronic artifacts. In some instances, example process 200 may comprise or more aspects of example operating environment 100, such as discussed above with reference to FIG. 1, for example. As such, one or more entities of FIG. 2 may, for example, correspond to and/or share common features with like or similar entities of FIG. 2.

For example, a Vendor 202 of FIG. 2 may correspond to and/or share common features with an artifact originator 102, 104, 106, etc. of FIG. 1. Further, even though an escrow service of FIG. 2 is illustrated as a centralized service, such as for ease of representation, it should be noted that such service may be distributed, such as discussed herein, with reference to FIG. 1. Likewise, here, it should also be noted that content acquired and/or produced, such as, for example, input signals, output signals, operations, results, etc. associated with example process 200 may comprise and/or be represented via one or more digital signals. Similarly, it should also be appreciated that even though one or more operations are illustrated and/or described concurrently and/or with respect to a certain sequence, other sequences and/or concurrent operations may be employed, in whole or in part. In addition, although the description below references particular aspects and/or features illustrated in certain other figures, one or more operations may be performed with other aspects and/or features.

As was indicated and as seen in a particular implementation of FIG. 2, example process 200 may be implemented via a number of example operational phases, which may include, for example, an Initialization phase 204, an Encoding and Distribution phase 206, a Status Checks phase 208, and a Release phase 210. Thus, during Initialization phase 204, Vendor 202 may, for example, electronically communicate with an Escrow Service 212, for example, as referenced via a message flow at 214, such as to register with the service for the purposes of holding an artifact of interest in escrow, as discussed above. This communication may be a one-time event, such as to create an account and/or login procedure for mutual authentication, for example, or, optionally or alternatively, may be repeated every time a new artifact is added to Escrow Service 212. As referenced at 216, Escrow Service 212 may, for example, respond with an escrow services contract detailing terms and/or conditions to govern an artifact going forward. In some instances, a services contract may, for example, be negotiated and/or communicated at registration or, optionally or alternatively, may be delayed until a specific artifact is added to Escrow Service 212. A smart contract, discussed above, may also be implemented herein and may be used, in whole or in part, to hold state, and/or may enter a current state into an event chain, such as for reference by subsequent contract executions. As was indicated, a smart contract essentially monitors and/or authorizes state changes automatically, such as without human intervention. One or more features of an escrow service that may be controlled by a smart contract may include, by way of example, tracking and recording of regular responses to assure fulfillment of terms of an escrow contract (e.g., a countdown timer state along with its resets, etc.), and/or, if a timer is exceeded without a satisfactory response, a transition to a conversion state. In some instances, a smart contract may remain substantially unchanged, such as once finalized into a suitable blockchain, which may include a sidechain, for this example implementation. Particular examples of blockchains as well as tracking and/or recording corresponding transactions with reference to example operational phases of FIG. 2 will be described in greater detail with reference to FIG. 3.

As was indicated, metadata may be effectively used to "fill in the blanks" in services contracts and may include, for example, software name and/or version identifier, a manifest of all included files and/or other objects necessary or useful to build infrastructure, how often Vendor 202 is obligated to contact Escrow Service 212 to maintain an artifact in escrow, any potential shared secrets for a given software release decryption, current closed source license (e.g., required by regulation, preferred by Vendor 202, etc.), license assignee and/or type (e.g., closed source, transfer to another vendor, creditor, etc., open source or both, etc.), open source repositories to hold a release (e.g. GitHub, etc.), etc. For services contracts, there may be provisions to cover, for example, terms and/or conditions for maintaining artifacts in their current state (e.g., typically, governing check-in frequency and/or number of allowed of missed check-ins), and/or details of a conversion process leading to release of an artifact. As was indicated, a services contract may, for example, have legal and/or functional equivalent of machine-readable code and/or instructions, such as in the form of a smart contract to be executed automatically, typically, although not necessarily, at Release phase 210, discussed below.

As further illustrated at 218, according to a particular implementation, one or more artifacts of interest, such as one or more licensed vendor artifacts may, for example, be sliced into a number of shards, may be securely encoded, and distributed over a suitable network overlay, such as during Encoding and Distribution phase 206. For this particular example, a "closed shard" may indicate existence of some proprietary and/or licensed artifact-related code, such as to be stored in a number of Closed Source Repositories, referenced generally at 220. In general, artifact shards, closed or otherwise, may be scattered to different locations, physical and/or mathematical, for example, and may even be on different types of media attached to applicable computing and/or storage devices that may be diverse in terms of software and/or hardware. As was indicated, a goal of such diversity is to make sure that overall ability to distribute and/or retrieve artifacts may remain intact, even if multiple nodes fail, such as due, at least in part, to natural disasters, power grid collapse, storage server security compromise and/or physical capture, network attack and/or collapse, or the like.

In an implementation, while securely encoding and/or distributing artifacts, a list of node addresses (e.g., network names, etc.) may, for example, be included in code metadata, as was indicated. Moreover, depending upon the way an artifact is encoded and/or distributed, it may be possible to assure that, as long as a certain proportion of distribution nodes remain accessible and/or secure, that the artifact is also kept secure, and that one or more failed nodes, if any, leak no information about it. Namely, if there are N nodes to which encoded data is scattered, then any subset of k>floor (N/2) nodes must be accessible to reconstruct an entire artifact. As a way of illustration, any 8 of 15 nodes may, for example, be sufficient to reconstruct an original artifact, though claimed subject matter is not so limited. Metadata necessary or otherwise useful for any node, whether it holds a slice of an artifact or not, may, for example, be made available at any node that may be contacted by Vendor 202. Note that, at times, part of this phase may be centralized, such as if shards are generated from a single source, for example, and, again, if shards are assembled to produce a new, likely modified under terms of Escrow Service 212, copy of an artifact.

Continuing with the above discussion, in an implementation, as referenced via a status-check message at 222, Vendor 202 may "ping" to or communicate with Escrow Service 212 so as to prove vendor's viability under the terms and/or conditions of an applicable services contract, such as within a contractually specified time window during Status Checks phase 208. As also illustrated, in response to status-check message 222, Escrow Service 212 may, for example, communicate an acknowledgement message 224, which, at times, may serve as a confirmation that an artifact will be maintained in escrow (e.g., storage terms will remain unchanged, etc.). However, if Vendor 202 fails some specified number of times to reach Escrow Service 212 via one or more specified communications, as illustrated schematically via a detected absence of status-check messages at 226 and 228, a set of recovery provisions in a services contract may, for example, be invoked. As was indicated, in some instances, recovery provisions in a services contract may, for example, give Vendor 202 an opportunity to recover from this failure, such as within some predetermined time frame. For example, recovery provisions may include alternative addresses, such as physical and/or Internet-based, various media, various timelines, puzzles, etc. To illustrate, here, even if Vendor 202 does reach Escrow Service 212 under the terms and/or conditions of such a services contract, Vendor 202 may, for example, face a challenge or "puzzle" requiring demonstration of expertise regarding an artifact of interest.

After one or more recovery provisions of a services contract are exhausted, reconstitution and/or release of a stored artifact may, for example, be triggered, such as during Release phase 210.

Thus, according to an implementation, during Release phase 210, artifact shards 230 may be gathered from a number of distributed repositories, such as Closed Source Repositories 232, for this particular example, at any sufficiently capable network node, which may also be a repository, so as to form a reconstructed and/or decrypted artifact image, as referenced herein via a licensed vendor code at 234. Here, as further illustrated at 236, an applicable conversion contract may, for example, be invoked, such as upon reconstituted and/or decrypted artifact image 234 so as to appropriately convert such an image to a closed and/or open source artifact, depending on an implementation. As an example, as seen at 238, conversion contract 236 may implement, for example, slicing of an artifact of interest into a number of shards, which may be relicensed to a new owner, may invoke a rewrite of some subset of one or more header files for applicable shards, such as to replace a closed source license and/or copyright claims with an open source one, as referenced generally at 240, while in parallel preparing legal documentation transferring copyright for registration. If applicable, one or more other files used, but not owned by Vendor 202, may, for example, remain as they were (e.g. open source components may remain open source, even if closed source files are transferred to another corporate entity as closed source software, etc.). If one or more files are closed source and owned by others or otherwise protected, then they may, for example, be removed from a source tree (e.g., may be replaced with stubs or a binary, may be removed entirely, etc.), which may also be stipulated in conversion contract 236. Also, at times, conversion contract 236 may specify, for example, where a resulting code tree is to be sent, such as a contribution to a number of Open Source Repositories 240, if applicable, including generating one or more new project pages, announcing an availability of an artifact as a community resource, etc., such as via one or more appropriate mechanisms for posting and/or broadcasting such information (e.g., on-line, etc.), or the like.

Figure 3:
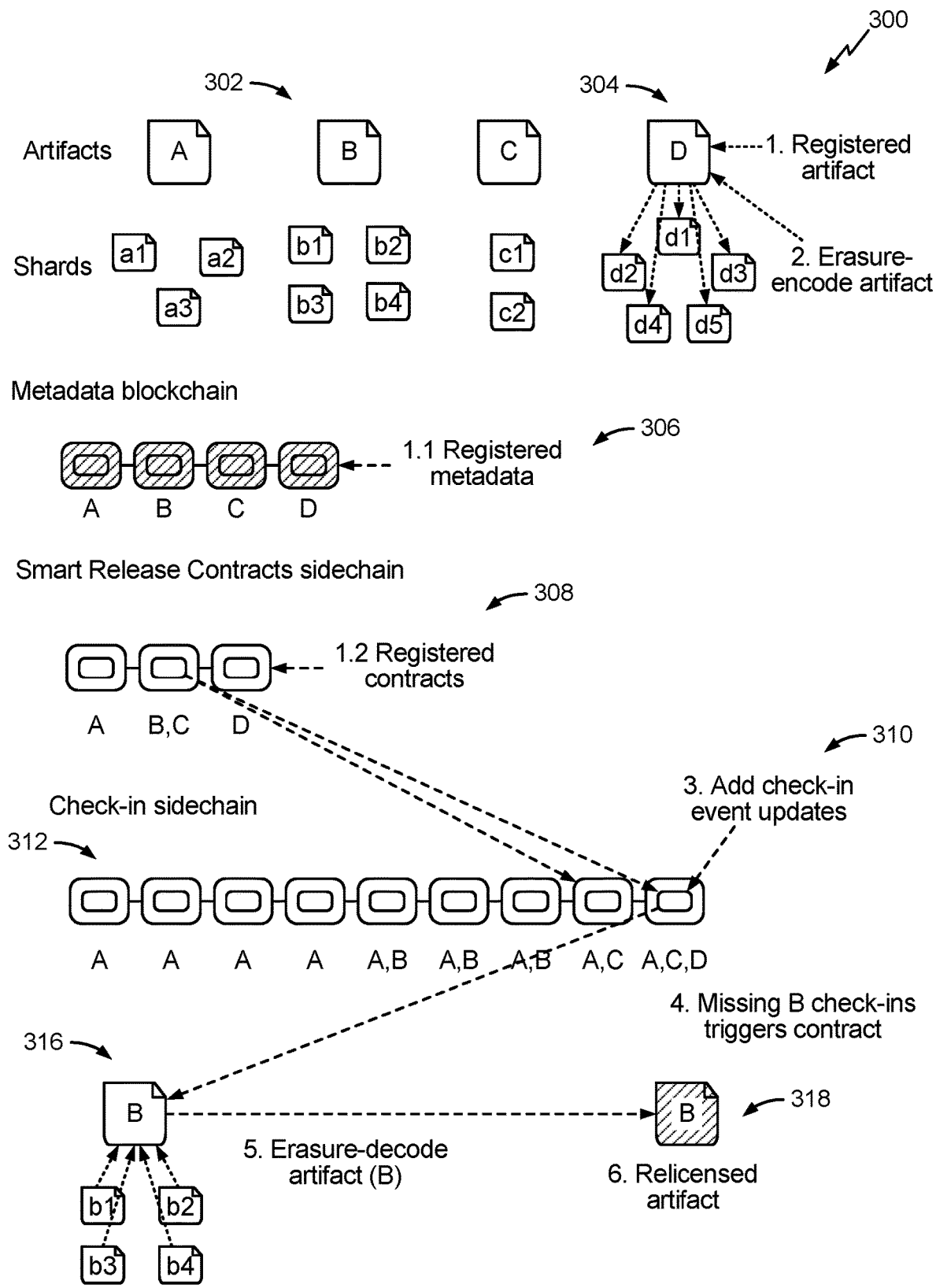
FIG. 3 is a schematic diagram illustrating an implementation of example storage repository actions for blockchain infrastructure for securing and/or managing electronic artifacts.

FIG. 3 is a schematic diagram illustrating an implementation of example storage repository actions 300 that may be employed, in whole or in part, to facilitate and/or support one or more operations and/or techniques for blockchain infrastructure for securing and/or managing electronic artifacts. As seen, storage repository actions are illustrated in connection with tracking and/or recording corresponding transactions via one or more blockchains and/or variants of blockchains, as well as artifact state changes corresponding to example operational phases of FIG. 2. For example, for ease of discussion, major (e.g., first) numbered entries in FIG. 3 correspond to like major numbered entries in FIG. 2, and, likewise, minor (e.g., second) numbered entries in FIG. 3 correspond to like minor numbered entries in FIG. 2. Here, major numbered entries serialize particular transactions, for example, while minor numbers may also occur in parallel.

Thus, as illustrated generally at 302, a number of artifacts of interest, such as example artifacts A, B, C, and D, for example, may be sliced into any suitable sets of shards of various sizes and/or numbers, such as for the purposes of secure storage on a network overlay, as discussed above. For example, as seen, artifact A may be sliced into three shards: a1, a2, and a3, artifact B may be sliced into four shards: b1, b2, b3, and b4, artifact C may be sliced into two shards: c1 and c2, artifact D may be sliced into five shards: d1, d2, d3, d4, and d5, and so forth. Claimed subject matter is not so limited, of course. Any other suitable slicing of artifacts may be implemented herein. In some instances, this sharding may, for example, correspond to Encoding and Distribution phase 206 of FIG. 2. These or like transactions are represented generally with a major number of 2. In some instances, as referenced at 304, an artifact of interest, such as artifact D, for this example, may be erasure-encoded, although claimed subject matter is also not limited in this regard. For example, at times, artifact shards may be encrypted, such as for efficiency and/or security reasons, for example, with a key management process and may be stored in one or more sidechains. If multiple sidechains are so enabled, erasure encoding may be used, at least in part, to protect an artifact, such as instead of encryption, and a number of physically and/or mathematically scattered distinct sidechains may be similar or, at times, identical to a number of earlier storage repositories used. In some instances, these or like approaches may, for example, represent different tradeoffs in storage overheads and/or key management complexity with a kind of "belt and suspenders" security model.

In an implementation, one or more transactions with a major number of 1 may, for example, represent registration of artifacts A, B, C, and D and/or recordation of contractual terms and/or conditions associated with it once the artifacts are added to an escrow service (e.g., Escrow Service 212 of FIG. 2, etc.). In some instances, this may, for example, correspond to Initialization phase 204 of FIG. 2. One or more contractual terms and/or conditions may, for example, be converted into machine-readable code and/or instructions (e.g., smart contracts, etc.) in which metadata may be structured to effectively "fill in the blanks" of reusable templates, as was indicated. In some instances, customization of a smart contract may be required and/or useful, but in many instances, a smart contract may, for example, function as a self-contained automatic policy step. To capture this, at times, metadata and a smart contract for artifacts A, B, C, and D may, for example, be recorded and/or securely stored in one or more sidechains, illustrated respectively herein via a metadata blockchain at 306 and a smart release contract sidechain at 308.

Further, according to an implementation, one or more transactions with a major number of 3 may represent a cadence of check-ins, such as implemented to prove "liveliness" of an artifact originator (e.g., Vendor 202 of FIG. 2, etc.), as discussed above. Here, as referenced at 310, check-in event updates may, for example, be added to a number of blocks comprising a check-in sidechain 312 that may be paired with a main blockchain. For this example, as seen, check-in sidechain 312 may comprise, for example, stored records for check-in events for artifact A (e.g., nine check-in events, etc.), artifact B (e.g., three check-in events, etc.), artifact C (e.g., three check-in events, etc.), etc. Smart contracts stored on check-in sidechain 312 may, for example, operate on these or like events so as to facilitate and/or support Status Checks phase 208 of FIG. 2, etc., as was also discussed.

In an implementation, such as in operative use, as illustrated via a number of blocks comprising check-in sidechain 312, one or more transactions at first show a regular pattern of "pings" (e.g., by Vendor 202 of FIG. 2, etc.) for artifact A as well as later-added artifacts B, C, and D, such as up to two missed "pings" with respect to artifact B (e.g., two last blocks, etc.). These or like transactions are represented via major number 4 in FIGS. 2 and 3, and may, for example, trigger an execution of an applicable smart contract, such as to countdown an absence of one or more status-check messages for artifact B, as was indicated. For example, if expected contact for artifact B (e.g., via status-check message 222 of FIG. 2, etc.) has not occurred after some predetermined time window, such as, for this example, a second time window represented via the last recorded block at 314, a conversion contract may be invoked so as to gather applicable artifact shards and/or erasure-decode them, as referenced at 316, and reconstitute an relicensed image or copy of an artifact, as one example, referenced at 318. As was indicated, at times, artifact B may, for example, be converted to be open source, such as again sliced into a suitable set of shards and/or placed into a distributed open repository (e.g., Open Source Repository 240 of FIG. 2, etc.). In some instances, if suitable, slices of artifact B may, for example, be placed into some centralized cloud service (e.g., GitHub, etc.), which may depend, at least in part, upon one or more terms and/or conditions that parameterize an applicable conversion contract (e.g., conversion contract 236 of FIG. 2, etc.), as was also discussed.

Figure 4:
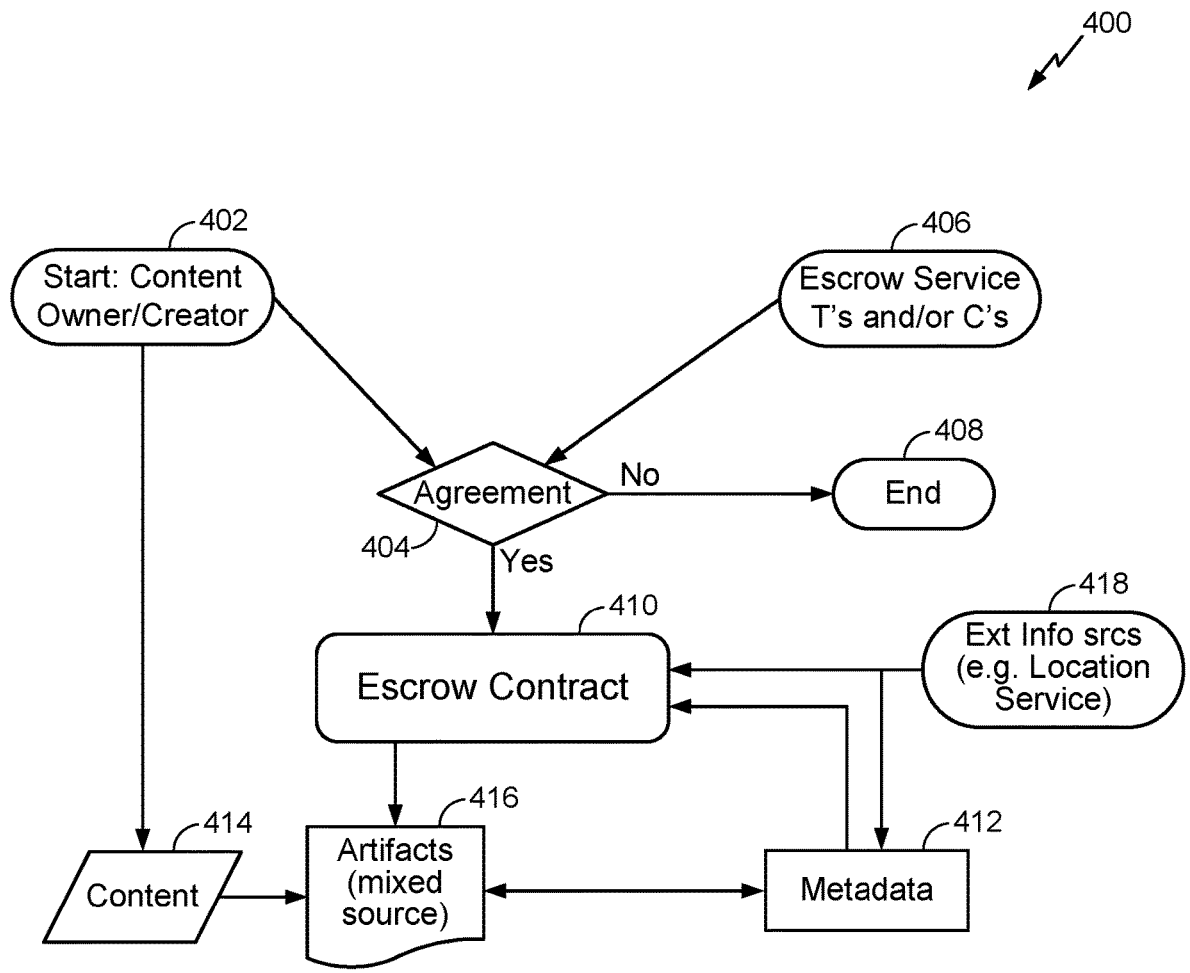
FIG. 4 is a flow diagram illustrating an implementation of an example process for blockchain infrastructure for securing and/or managing electronic artifacts.

Attention is now drawn to FIG. 4, which is a flow diagram illustrating an implementation of an example process 400 that may be performed to facilitate and/or support one or more operations and/or techniques for blockchain infrastructure for securing and/or managing electronic artifacts, such as in connection with Initialization phase 204 of FIG. 2, for example. It should be noted that content acquired and/or produced, such as, for example, input signals, output signals, operations, results, etc. associated with example process 400 may comprise and/or be represented via one or more digital signals. It should also be appreciated that even though one or more operations are illustrated and/or described concurrently and/or with respect to a certain sequence, other sequences and/or concurrent operations may be employed, in whole or in part. In addition, although the description below references particular aspects and/or features illustrated in certain other figures, one or more operations may be performed with other aspects and/or features.

As illustrated, example process 400 may, for example, begin at operation 402, such as by an artifact originator, which may comprise an owner/creator of particular artifact-related content (e.g., software, firmware, documentation, etc.), as one possible implementation, contacting a suitable escrow service for the purposes of storing an artifact of interest. Example process 400 may proceed to operation 404 where an agreement between a content owner/originator and an escrow service may be negotiated, such as, for example, using one or more escrow's terms and/or conditions, referenced generally at 406. If no agreement between a content owner/originator and an escrow service is reached, example process 400 may terminate, as referenced at 408. If yes, on the other hand, example process 400 may proceed to operation 410, during which an escrow contract may, for example, be formalized (e.g., signed, etc.). As was indicated, an escrow contact may comprise, for example, a services contacts having one or more terms and/or conditions relating to storage and/or release of an artifact, such as how it is to be maintained, where it is to be released, schedule for the release, waiting period before release, actions to reclaim an artifact prior to release, jurisdictional requirements, or the like. An escrow contract may also include, for example, one or more terms and/or conditions governing associated metadata, referenced generally at 412, that may be used, at least in part, to "fill in the blanks" in the escrow contract, such as via reusable templates, as was indicated. As illustrated at 414, content may be added to an escrow service as artifacts 416 at once, such as upon registration, for example, or a particular artifact may be added separately. Here, a "mixed source" refers to artifacts created from a mixture of components under more than one distinct license. For example, particular compilers may be covered by GPLv3, particular network libraries by NetBSD, some math libraries by GPLv2, data monitoring by Apache licenses, etc., while application libraries may include code owned by several companies and/or licensed to an artifact originator/owner, which may also include that owner's distinctive code. In some instances, an escrow contract may include some external information, referenced generally at 418, such as, for example, an artifact release location, location of an applicable server (e.g., via DNS-Sec information, GPS-type location service, etc.), default owner in case of mandated regulatory transfer period, time-windowed copyright for transfer to an open source or another public entity, or the like, as was also discussed.

Figure 5A:
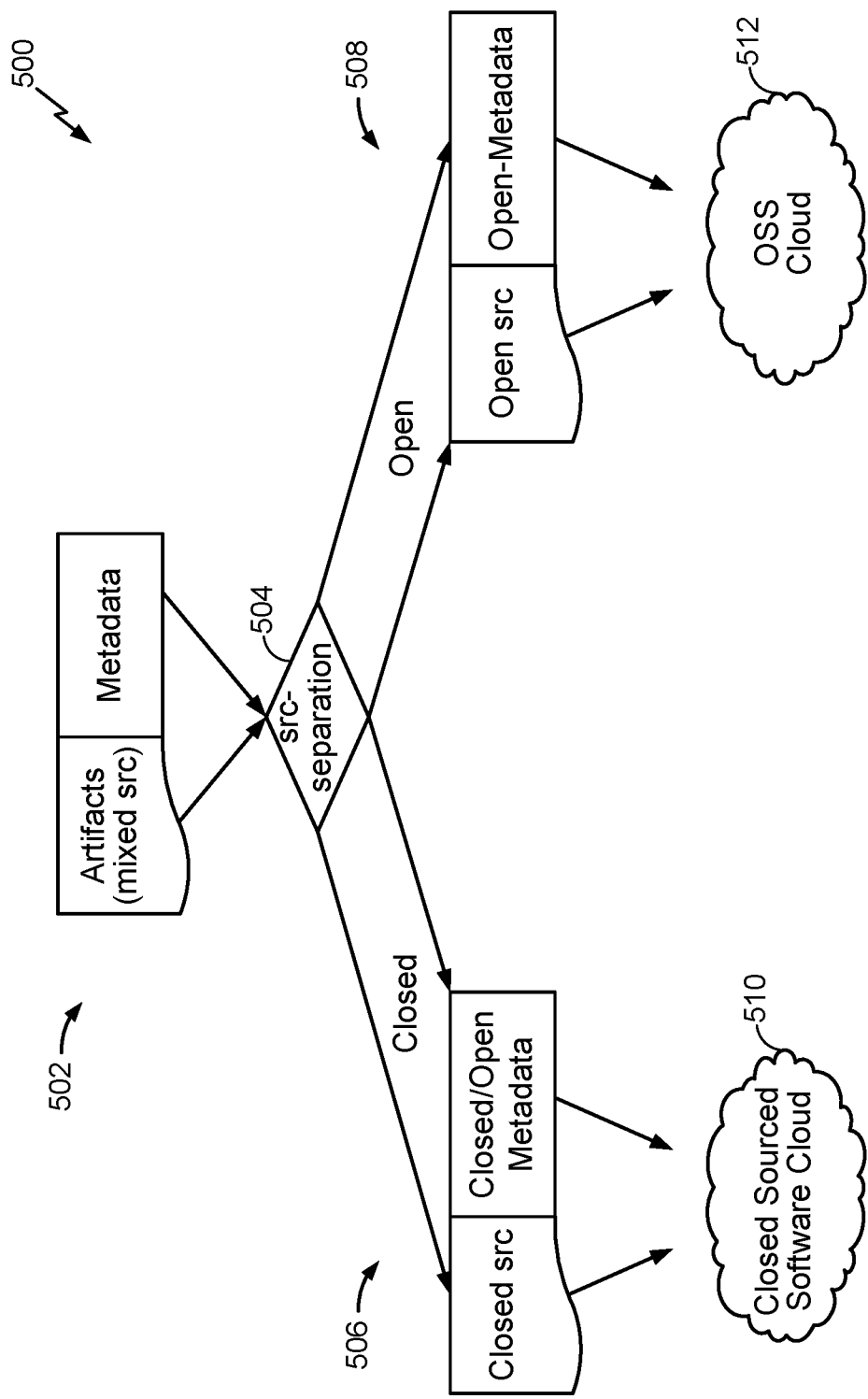
FIG. 5A is a flow diagram illustrating another implementation of an example process for blockchain infrastructure for securing and/or managing electronic artifacts.
Figure 5B:
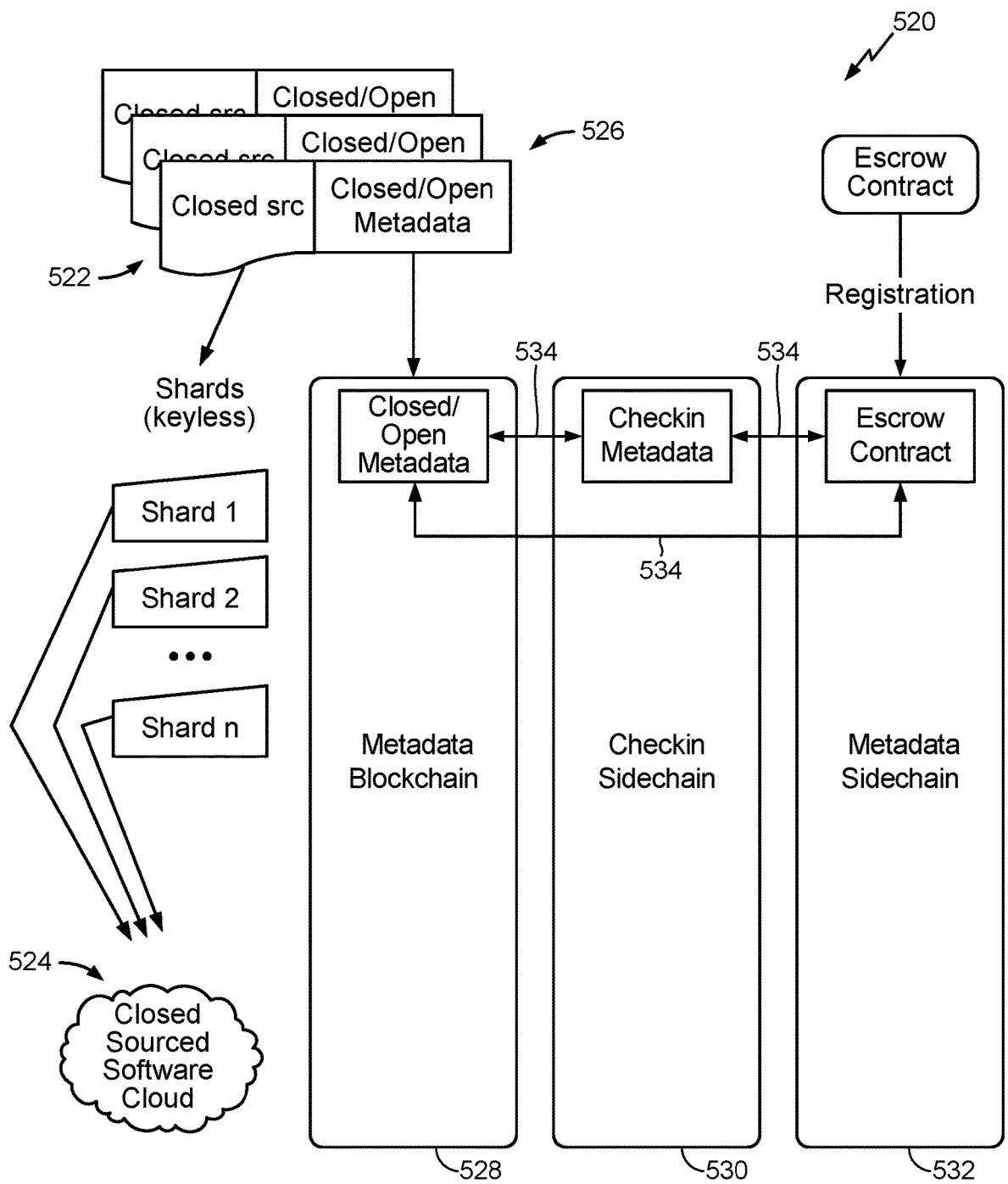
FIG. 5B is a flow diagram illustrating yet another implementation of an example process for blockchain infrastructure for securing and/or managing electronic artifacts.

FIGS. 5A and 5B are flow diagrams illustrating implementations of an example process 500 that may be performed to facilitate and/or support one or more operations and/or techniques for blockchain infrastructure for securing and/or managing electronic artifacts, such as in connection with Encoding and Distribution phase 206 of FIG. 2, for example. It should be noted that content acquired and/or produced, such as, for example, input signals, output signals, operations, results, etc. associated with example process 500 may comprise and/or be represented via one or more digital signals. It should also be appreciated that even though one or more operations are illustrated and/or described concurrently and/or with respect to a certain sequence, other sequences and/or concurrent operations may be employed, in whole or in part. In addition, although the description below references particular aspects and/or features illustrated in certain other figures, one or more operations may be performed with other aspects and/or features.

Referring to FIG. 5A, as discussed above, artifacts and associated metadata, referenced generally at 502, may, for example, be securely encoded and reduced into a number of shards, as illustrated via operation 504. Shards may then be distributed to a number of physically distinct storage locations that may include, for example, a closed source location 506 and/or open source location 508, such as according to terms and/or conditions of an escrow contract. As referenced respectively at 510 and 512, artifact shards may be distributed over a suitable network overlay, for example, which, in some instances, may include one or more cloud services, such as, for this example, a closed source software cloud and an operations support system cloud. These or like cloud services may comprise one or more blockchains and/or one or more variants of blockchains, such as a main blockchain and a number of linked sidechains, for example, so as to facilitate and/or support resiliency and/or security against cloud provider failures as well as artifact and/or escrow service providers. It should be noted that often an authenticated cloud failure (as opposed to a malicious spoofing of the cloud failure) means one or another form of offline unavailability over a particular network. Given that it is a redundant cloud infrastructure, even if a cloud is itself unavailable, it is designed for data to be resurrected in relatively short order (e.g., hours rather months) in many instances, outside of the most catastrophic scenarios. Here, timers may, for example, need to be reset, such as to account for cloud failure, but functionality should remain intact once service is restored.

Referring now to FIG. 5B, which is a flow diagram illustrating another implementation of example process 500, such as via a storage repository-centric perspective in connection with Encoding and Distribution phase 206 of FIG. 2, for example. Here, artifact-related content, such as represented via a "closed" or proprietary/licensed source at 502, may, for example, be sharded in a suitable manner (e.g., a keyless manner, etc.) and may be subsequently distributed over a suitable network overlay, such as a closed sourced software cloud 504, for this example. A "keyless" sharding and/or distribution may signify, for example, utilization of a suitable coding theory so as to efficiently replicate just enough information that if some distributed repositories are lost, then some subset of the remaining ones suffice to recover the data, as discussed above. Further, artifact-related content, such as represented via a mixture of open and closed metadata at 506, for example, may be stored in one or more blockchains and/or variants of blockchains, as also discussed above. For example, as seen and as also discussed, closed/open source (e.g., mixed, etc.) metadata 506 may be stored in a metadata blockchain 508, while check-in metadata may be stored in a check-in sidechain 510, just to illustrate one possible implementation. It should be noted that, since a blockchain is a specific variant of a secure log, there may be one or more other variants that may provide the same or similar functionality, but with different tradeoffs, such as, for example, a centralized or weakly distributed encrypted log file, or the like.

As also illustrated, in some instances, such as to capture self-contained enforcement policy steps, for example, machine-automated smart contracts and associated metadata may be stored in a separate but linked metadata sidechain 512, as was indicated. Again, smart contracts may comprise, for example, provisions of an escrow contract (e.g., negotiated and/or finalized at registration, etc.) translated into machine-readable code and/or instructions so as determine and/or enforce a set of rules governing maintenance and/or conversion of stored artifacts from one owner to another. As referenced generally via links at 514 and as also discussed above, blockchains 508 and sidechains 510 and 512 may, for example, be linked, such as to capture and/or operate on one or more applicable events and/or transactions, as also discussed herein. Smart contracts data requirements are typically self-contained since these are based, at least in part, on parameters provided in a particular escrow agreement, for example, but if local and/or temporal state is required or otherwise useful, then these may be drawn from trusted and/or authenticated oracles that provide interfaces to the world outside of a particular escrow system and/or network.

Figure 6:
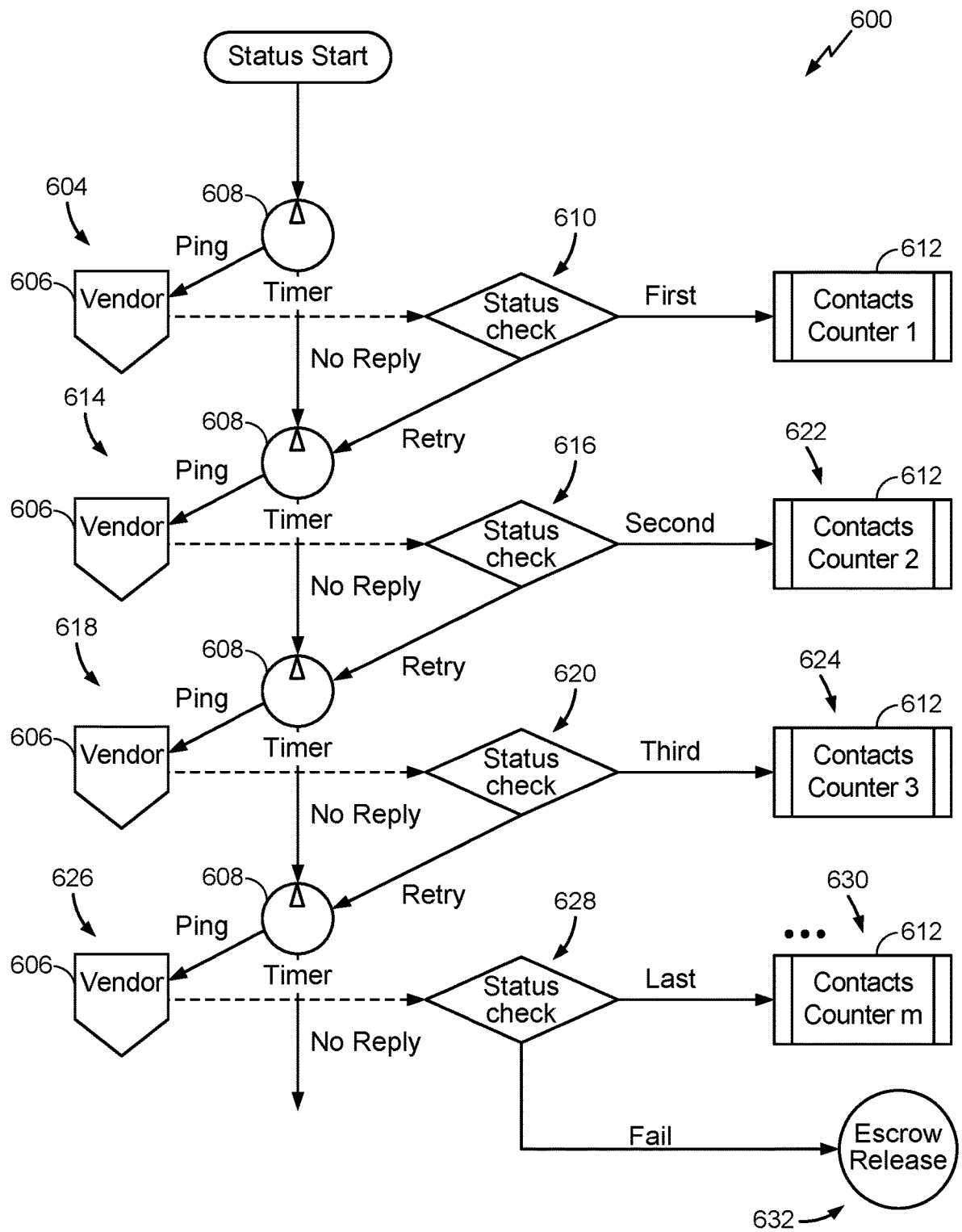
FIG. 6 is a flow diagram illustrating yet another implementation of an example process for blockchain infrastructure for securing and/or managing electronic artifacts.

Attention is now drawn to FIG. 6, which is a flow diagram illustrating an implementation of an example process 600 that may be performed to facilitate and/or support one or more operations and/or techniques for blockchain infrastructure for securing and/or managing electronic artifacts, such as in connection with Status Checks phase 208 of FIG. 2, for example. It should be noted that content acquired and/or produced, such as, for example, input signals, output signals, operations, results, etc. associated with example process 600 may comprise and/or be represented via one or more digital signals. It should also be appreciated that even though one or more operations are illustrated and/or described concurrently and/or with respect to a certain sequence, other sequences and/or concurrent operations may be employed, in whole or in part. In addition, although the description below references particular aspects and/or features illustrated in certain other figures, one or more operations may be performed with other aspects and/or features.

Thus, example process 600 may, for example, begin at operation 602 and may proceed to operation 604, where an electronic communication or "ping" message to a vendor 606 may be transmitted by an escrow service, such as requesting an acknowledgement via a status-check message, for example. As was indicated, such a ping may be transmitted randomly and/or within some predefined time frame, such as according to terms and/or conditions of an escrow contract, for example, that may be monitored by a timer 608. For example, in some instances, a ping may randomly and/or synchronously poll for an artifact owner state, or, optionally or alternatively, the artifact owner may be responsible for pinging or initiating contacts preemptively. As referenced at operation 610, if there is no reply, such as detected via an absence of a status-check message from vendor 606, for example, a contacts counter 612 counting a number of requests for a status-check message may be incremented in a suitable manner. For example, as seen, in some instances, contacts counter 612 may be incremented by 1 (one) every time an absence of a status-check message is detected. As further illustrated via respective operations 614 and 618, a second and a third "ping" may be transmitted to vendor 606, such as consecutively and/or at random times within messaging windows monitored by timer 608, for example, and an absence of respective status-check messages may also be detected, as referenced at operations 616 and 620, respectively. Likewise, here, contacts counter may, for example, be incremented in a similar manner, such as by 1 (one) every time an absence of a status-check message is detected, as referenced at 622 and 624, respectively.

With regard to operation 626, if, after another timely ping monitored by timer 608, yet another absence of a status-check message from vendor 606 is detected, as referenced at 628, such as in a similar fashion, it may be determined whether incremented contacts counter 612 reached or exceeded some threshold number m, as referenced at 630. If a threshold number of detected absences of status-check messages is reached or exceeded, it may, for example, be determined that vendor 606 fails to satisfy terms and/or conditions of an escrow account. Here, a stored artifact of interest may be reconstituted, such as via one or more techniques discussed herein, and may, for example, be released, at illustrated at operation 632, such as under new ownership constraints to one or more designated release repositories, as was also discussed. A threshold number of detected absences of status-check messages may be determined, at least in part, experimentally and may be set, predefined, and/or configured (e.g., by an escrow service, service provider, etc.), for example, or otherwise dynamically defined in some manner depending on a particular escrow contract, application, geographic area, artifact, or the like. For example, most releases are not time critical and may take place with latencies of days. In some instances, however, code must be released much faster to satisfy some security or other emergency need. Here, a release may, for example, be governed by escrow contract provisions for more frequent "pings", or an owner may be obligated to more frequent preemptive messages, or an escrow service may have a special secure trigger mechanism for near immediate release, such as under a court order, which may have a delay measured in seconds and minutes, rather than days. Similarly, an unreliable network may, for example, necessitate many more message attempts, such as 100 instead of 10, by way of example. Of course, details relating to pings, releases, attempts, etc. are intended as merely examples to which claimed subject matter is not limited.

Figure 7:
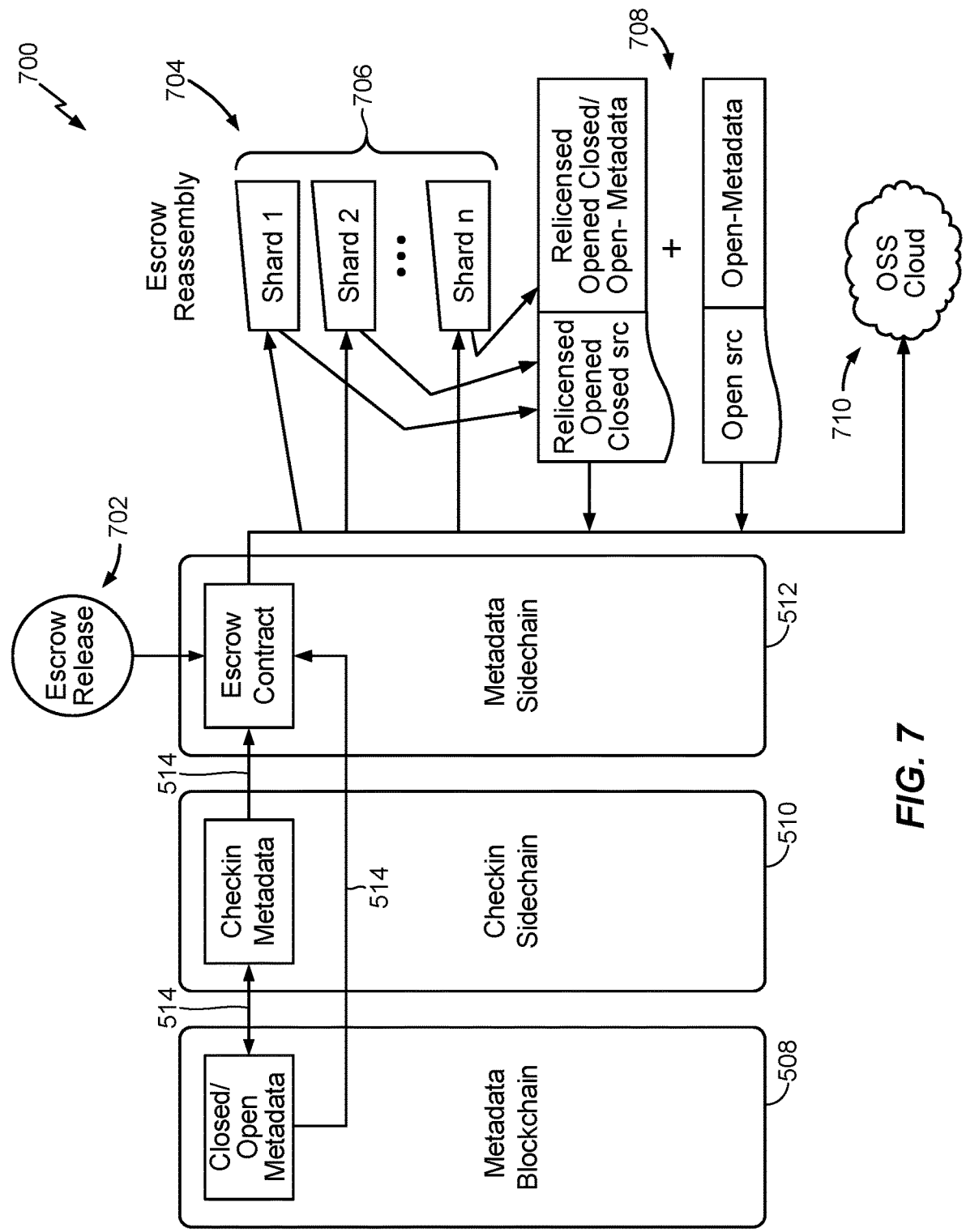
FIG. 7 is a flow diagram illustrating yet another implementation of an example process for blockchain infrastructure for securing and/or managing electronic artifacts.

Continuing now with FIG. 7, which is a flow diagram illustrating an implementation of an example process 700 that may be performed to facilitate and/or support one or more operations and/or techniques for blockchain infrastructure for securing and/or managing electronic artifacts, such as in connection with Release phase 210 of FIG. 2, for example. It should be noted that content acquired and/or produced, such as, for example, input signals, output signals, operations, results, etc. associated with example process 700 may comprise and/or be represented via one or more digital signals. It should also be appreciated that even though one or more operations are illustrated and/or described concurrently and/or with respect to a certain sequence, other sequences and/or concurrent operations may be employed, in whole or in part. In addition, although the description below references particular aspects and/or features illustrated in certain other figures, one or more operations may be performed with other aspects and/or features.

Example process 700 may, for example, begin at operation 702 with a decision by an escrow service to release an artifact of interest, which may be based, at least in part, on failure to fulfill a mutually agreed upon contractual commitment monitored by a set of watchdog timer events, as previously discussed. As illustrated at 704, applicable artifact shards may be gathered from a number of applicable repositories, such as at any sufficiently capable service node, for example, so as to form a reconstructed and/or decrypted image of an artifact, referenced generally at 706. As was also discussed, if applicable, here, a conversion contract may, for example, be invoked upon reconstituted artifact 706 and/or associated metadata, such as to appropriately convert artifact 706 and/or metadata to open source, as referenced at 708. For example, a conversion contract may invoke a rewrite of some subset of header files, replace some closed source license and/or copyright claims with an open source one, while in parallel preparing legal documentation transferring the copyright for registration, or the like. As further illustrated at 710, in some instances, reconstituted artifact 706 may, for example, be placed into a distributed open repository or some centralized cloud service (e.g., OSS cloud, etc.) under terms of a reassigned license, which may depend, at least in part, upon terms and/or conditions that parameterize an applicable conversion contract, as was also discussed.

In the context of the present disclosure, the term "connection," the term "component" and/or similar terms are intended to be physical, but are not necessarily always tangible. Whether or not these terms refer to tangible subject matter, thus, may vary in a particular context of usage. As an example, a tangible connection and/or tangible connection path may be made, such as by a tangible, electrical connection, such as an electrically conductive path comprising metal or other electrical conductor, that is able to conduct electrical current between two tangible components. Likewise, a tangible connection path may be at least partially affected and/or controlled, such that, as is typical, a tangible connection path may be open or closed, at times resulting from influence of one or more externally derived signals, such as external currents and/or voltages, such as for an electrical switch. Non-limiting illustrations of an electrical switch include a transistor, a diode, etc. However, a "connection" and/or "component," in a particular context of usage, likewise, although physical, can also be non-tangible, such as a connection between a client and a server over a network, which generally refers to the ability for the client and server to transmit, receive, and/or exchange communications, as discussed in more detail later.

In a particular context of usage, such as a particular context in which tangible components are being discussed, therefore, the terms "coupled" and "connected" are used in a manner so that the terms are not synonymous. Similar terms may also be used in a manner in which a similar intention is exhibited. Thus, "connected" is used to indicate that two or more tangible components and/or the like, for example, are tangibly in direct physical contact. Thus, using the previous example, two tangible components that are electrically connected are physically connected via a tangible electrical connection, as previously discussed. However, "coupled," is used to mean that potentially two or more tangible components are tangibly in direct physical contact. Nonetheless, is also used to mean that two or more tangible components and/or the like are not necessarily tangibly in direct physical contact, but are able to co-operate, liaise, and/or interact, such as, for example, by being "optically coupled." Likewise, the term "coupled" may be understood to mean indirectly connected in an appropriate context. It is further noted, in the context of the present disclosure, the term physical if used in relation to memory, such as memory components or memory states, as examples, necessarily implies that memory, such memory components and/or memory states, continuing with the example, is tangible.

Additionally, in the present disclosure, in a particular context of usage, such as a situation in which tangible components (and/or similarly, tangible materials) are being discussed, a distinction exists between being "on" and being "over." As an example, deposition of a substance "on" a substrate refers to a deposition involving direct physical and tangible contact without an intermediary, such as an intermediary substance (e.g., an intermediary substance formed during an intervening process operation), between the substance deposited and the substrate in this latter example; nonetheless, deposition "over" a substrate, while understood to potentially include deposition "on" a substrate (since being "on" may also accurately be described as being "over"), is understood to include a situation in which one or more intermediaries, such as one or more intermediary substances, are present between the substance deposited and the substrate so that the substance deposited is not necessarily in direct physical and tangible contact with the substrate.

A similar distinction is made in an appropriate particular context of usage, such as in which tangible materials and/or tangible components are discussed, between being "beneath" and being "under." While "beneath," in such a particular context of usage, is intended to necessarily imply physical and tangible contact (similar to "on," as just described), "under" potentially includes a situation in which there is direct physical and tangible contact, but does not necessarily imply direct physical and tangible contact, such as if one or more intermediaries, such as one or more intermediary substances, are present. Thus, "on" is understood to mean "immediately over" and "beneath" is understood to mean "immediately under."

It is likewise appreciated that terms such as "over" and "under" are understood in a similar manner as the terms "up," "down," "top," "bottom," and so on, previously mentioned. These terms may be used to facilitate discussion, but are not intended to necessarily restrict scope of claimed subject matter. For example, the term "over," as an example, is not meant to suggest that claim scope is limited to only situations in which an embodiment is right side up, such as in comparison with the embodiment being upside down, for example. An example includes a flip chip, as one illustration, in which, for example, orientation at various times (e.g., during fabrication) may not necessarily correspond to orientation of a final product. Thus, if an object, as an example, is within applicable claim scope in a particular orientation, such as upside down, as one example, likewise, it is intended that the latter also be interpreted to be included within applicable claim scope in another orientation, such as right side up, again, as an example, and vice-versa, even if applicable literal claim language has the potential to be interpreted otherwise. Of course, again, as always has been the case in the specification of a patent application, particular context of description and/or usage provides helpful guidance regarding reasonable inferences to be drawn.

Unless otherwise indicated, in the context of the present disclosure, the term "or" if used to associate a list, such as A, B, or C, is intended to mean A, B, and C, here used in the inclusive sense, as well as A, B, or C, here used in the exclusive sense. With this understanding, "and" is used in the inclusive sense and intended to mean A, B, and C; whereas "and/or" can be used in an abundance of caution to make clear that all of the foregoing meanings are intended, although such usage is not required. In addition, the term "one or more" and/or similar terms is used to describe any feature, structure, characteristic, and/or the like in the singular, "and/or" is also used to describe a plurality and/or some other combination of features, structures, characteristics, and/or the like. Furthermore, the terms "first," "second" "third," and the like are used to distinguish different aspects, such as different components, as one example, rather than supplying a numerical limit or suggesting a particular order, unless expressly indicated otherwise. Likewise, the term "based on" and/or similar terms are understood as not necessarily intending to convey an exhaustive list of factors, but to allow for existence of additional factors not necessarily expressly described.

Furthermore, it is intended, for a situation that relates to implementation of claimed subject matter and is subject to testing, measurement, and/or specification regarding degree, to be understood in the following manner. As an example, in a given situation, assume a value of a physical property is to be measured. If alternatively reasonable approaches to testing, measurement, and/or specification regarding degree, at least with respect to the property, continuing with the example, is reasonably likely to occur to one of ordinary skill, at least for implementation purposes, claimed subject matter is intended to cover those alternatively reasonable approaches unless otherwise expressly indicated. As an example, if a plot of measurements over a region is produced and implementation of claimed subject matter refers to employing a measurement of slope over the region, but a variety of reasonable and alternative techniques to estimate the slope over that region exist, claimed subject matter is intended to cover those reasonable alternative techniques, even if those reasonable alternative techniques do not provide identical values, identical measurements or identical results, unless otherwise expressly indicated.

It is further noted that the terms "type" and/or "like," if used, such as with a feature, structure, characteristic, and/or the like, using "optical" or "electrical" as simple examples, means at least partially of and/or relating to the feature, structure, characteristic, and/or the like in such a way that presence of minor variations, even variations that might otherwise not be considered fully consistent with the feature, structure, characteristic, and/or the like, do not in general prevent the feature, structure, characteristic, and/or the like from being of a "type" and/or being "like," (such as being an "optical-type" or being "optical-like," for example) if the minor variations are sufficiently minor so that the feature, structure, characteristic, and/or the like would still be considered to be predominantly present with such variations also present. Thus, continuing with this example, the terms optical-type and/or optical-like properties are necessarily intended to include optical properties. Likewise, the terms electrical-type and/or electrical-like properties, as another example, are necessarily intended to include electrical properties. It should be noted that the specification of the present disclosure merely provides one or more illustrative examples and claimed subject matter is intended to not be limited to one or more illustrative examples; however, again, as has always been the case with respect to the specification of a patent application, particular context of description and/or usage provides helpful guidance regarding reasonable inferences to be drawn.

With advances in technology, it has become more typical to employ distributed computing and/or communication approaches in which portions of a process, such as signal processing of signal samples, for example, may be allocated among various devices, including one or more client devices, one or more server devices and/or one or more peer-to-peer devices, via a computing and/or communications network, for example. A network may comprise two or more devices, such as network devices and/or computing devices, and/or may couple devices, such as network devices and/or computing devices, so that signal communications, such as in the form of signal packets and/or signal frames (e.g., comprising one or more signal samples), for example, may be exchanged, such as between a server device, a client device and/or a peer-to-peer device, as well as other types of devices, including between wired and/or wireless devices coupled via a wired and/or wireless network, for example.

An example of a distributed computing system comprises the so-called Hadoop distributed computing system, which employs a map-reduce type of architecture. In the context of the present disclosure, the terms map-reduce architecture and/or similar terms are intended to refer to a distributed computing system implementation and/or embodiment for processing and/or for generating larger sets of signal samples employing map and/or reduce operations for a parallel, distributed process performed over a network of devices. A map operation and/or similar terms refer to processing of signals (e.g., signal samples) to generate one or more key-value pairs and to distribute the one or more pairs to one or more devices of the system (e.g., network). A reduce operation and/or similar terms refer to processing of signals (e.g., signal samples) via a summary operation (e.g., such as counting the number of students in a queue, yielding name frequencies, etc.). A system may employ such an architecture, such as by marshaling distributed server devices, executing various tasks in parallel, and/or managing communications, such as signal transfers, between various parts of the system (e.g., network), in an embodiment. As mentioned, one non-limiting, but well-known, example comprises the Hadoop distributed computing system. It refers to an open source implementation and/or embodiment of a map-reduce type architecture (available from the Apache Software Foundation, 1901 Munsey Drive, Forrest Hill, Md., 21050-2747), but may include other aspects, such as the Hadoop distributed file system (HDFS) (available from the Apache Software Foundation, 1901 Munsey Drive, Forrest Hill, Md., 21050-2747). In general, therefore, "Hadoop" and/or similar terms (e.g., "Hadoop-type," etc.) refer to an implementation and/or embodiment of a scheduler for executing larger processing jobs using a map-reduce architecture over a distributed system. Furthermore, in the context of the present disclosure, use of the term "Hadoop" is intended to include versions, presently known and/or to be later developed.

In the context of the present disclosure, the term "network device" refers to any device capable of communicating via and/or as part of a network and may comprise a computing device. While network devices may be capable of communicating signals (e.g., signal packets and/or frames), such as via a wired and/or wireless network, they may also be capable of performing operations associated with a computing device, such as arithmetic and/or logic operations, processing and/or storing operations (e.g., storing signal samples), such as in a non-transitory memory as tangible, physical memory states, and/or may, for example, operate as a server device and/or a client device in various embodiments. Network devices capable of operating as a server device, a client device and/or otherwise, may include, as examples, dedicated rack-mounted servers, desktop computers, laptop computers, set top boxes, tablets, netbooks, smart phones, wearable devices, integrated devices combining two or more features of the foregoing devices, and/or the like, or any combination thereof. As mentioned, signal packets and/or frames, for example, may be exchanged, such as between a server device and/or a client device, as well as other types of devices, including between wired and/or wireless devices coupled via a wired and/or wireless network, for example, or any combination thereof. It is noted that the terms, server, server device, server computing device, server computing platform and/or similar terms are used interchangeably. Similarly, the terms client, client device, client computing device, client computing platform and/or similar terms are also used interchangeably. While in some instances, for ease of description, these terms may be used in the singular, such as by referring to a "client device" or a "server device," the description is intended to encompass one or more client devices and/or one or more server devices, as appropriate. Along similar lines, references to a "database" are understood to mean, one or more databases and/or portions thereof, as appropriate.

It should be understood that for ease of description, a network device (also referred to as a networking device) may be embodied and/or described in terms of a computing device and vice-versa. However, it should further be understood that this description should in no way be construed so that claimed subject matter is limited to one embodiment, such as only a computing device and/or only a network device, but, instead, may be embodied as a variety of devices or combinations thereof, including, for example, one or more illustrative examples.

A network may also include now known, and/or to be later developed arrangements, derivatives, and/or improvements, including, for example, past, present and/or future mass storage, such as network attached storage (NAS), a storage area network (SAN), and/or other forms of device readable media, for example. A network may include a portion of the Internet, one or more local area networks (LANs), one or more wide area networks (WANs), wire-line type connections, wireless type connections, other connections, or any combination thereof. Thus, a network may be worldwide in scope and/or extent. Likewise, sub-networks, such as may employ differing architectures and/or may be substantially compliant and/or substantially compatible with differing protocols, such as network computing and/or communications protocols (e.g., network protocols), may interoperate within a larger network.

In the context of the present disclosure, the term sub-network and/or similar terms, if used, for example, with respect to a network, refers to the network and/or a part thereof. Sub-networks may also comprise links, such as physical links, connecting and/or coupling nodes, so as to be capable to communicate signal packets and/or frames between devices of particular nodes, including via wired links, wireless links, or combinations thereof. Various types of devices, such as network devices and/or computing devices, may be made available so that device interoperability is enabled and/or, in at least some instances, may be transparent. In the context of the present disclosure, the term "transparent," if used with respect to particular communicating devices of a network, refers to the devices communicating via the network in which the devices are able to communicate via one or more intermediate devices, such as of one or more intermediate nodes, but without the communicating devices necessarily specifying the one or more intermediate nodes and/or the one or more intermediate devices of the one or more intermediate nodes. Thus, a network may include the one or more intermediate nodes and/or the one or more intermediate devices of the one or more intermediate nodes in communications and the network may engage in communications via the one or more intermediate nodes and/or the one or more intermediate devices of the one or more intermediate nodes, but the network may operate as if such intermediate nodes and/or intermediate devices are not necessarily involved in communications between the particular communicating devices. For example, a router may provide a link and/or connection between otherwise separate and/or independent LANs.

In the context of the present disclosure, a "private network" refers to a particular, limited set of devices, such as network devices and/or computing devices, able to communicate with other devices, such as network devices and/or computing devices, in the particular, limited set, such as via signal packet and/or signal frame communications, for example, without a need for re-routing and/or redirecting signal communications. A private network may comprise a stand-alone network; however, a private network may also comprise a subset of a larger network, such as, for example, without limitation, all or a portion of the Internet. Thus, for example, a private network "in the cloud" may refer to a private network that comprises a subset of the Internet. Although signal packet and/or frame communications (e.g. signal communications) may employ intermediate devices of intermediate nodes to exchange signal packets and/or signal frames, those intermediate devices may not necessarily be included in the private network by not being a source or designated destination for one or more signal packets and/or signal frames, for example. It is understood in the context of the present disclosure that a private network may direct outgoing signal communications to devices not in the private network, but devices outside the private network may not necessarily be able to direct inbound signal communications to devices included in the private network.

The Internet refers to a decentralized global network of interoperable networks that comply with the Internet Protocol (IP). It is noted that there are several versions of the Internet Protocol. The term Internet Protocol, IP, and/or similar terms are intended to refer to any version, now known and/or to be later developed. The Internet includes local area networks (LANs), wide area networks (WANs), wireless networks, and/or long haul networks that, for example, may allow signal packets and/or frames to be communicated between LANs. The term World Wide Web (WWW or Web) and/or similar terms may also be used, although it refers to a part of the Internet that complies with the Hypertext Transfer Protocol (HTTP). For example, network devices may engage in an HTTP session through an exchange of appropriately substantially compatible and/or substantially compliant signal packets and/or frames. It is noted that there are several versions of the Hypertext Transfer Protocol. The term Hypertext Transfer Protocol, HTTP, and/or similar terms are intended to refer to any version, now known and/or to be later developed. It is likewise noted that in various places in this document substitution of the term Internet with the term World Wide Web ("Web") may be made without a significant departure in meaning and may, therefore, also be understood in that manner if the statement would remain correct with such a substitution.

Although claimed subject matter is not in particular limited in scope to the Internet and/or to the Web; nonetheless, the Internet and/or the Web may without limitation provide a useful example of an embodiment at least for purposes of illustration. As indicated, the Internet and/or the Web may comprise a worldwide system of interoperable networks, including interoperable devices within those networks. The Internet and/or Web has evolved to a self-sustaining facility accessible to potentially billions of people or more worldwide. Also, in an embodiment, and as mentioned above, the terms "WWW" and/or "Web" refer to a part of the Internet that complies with the Hypertext Transfer Protocol. The Internet and/or the Web, therefore, in the context of the present disclosure, may comprise a service that organizes stored digital content, such as, for example, text, images, video, etc., through the use of hypermedia, for example. It is noted that a network, such as the Internet and/or Web, may be employed to store electronic files and/or electronic documents.

The term "electronic file" and/or the term "electronic document" or the like are used throughout this document to refer to a set of stored memory states and/or a set of physical signals associated in a manner so as to thereby at least logically form a file (e.g., electronic) and/or an electronic document. That is, it is not meant to implicitly reference a particular syntax, format and/or approach used, for example, with respect to a set of associated memory states and/or a set of associated physical signals. If a particular type of file storage format and/or syntax, for example, is intended, it is referenced expressly. It is further noted an association of memory states, for example, may be in a logical sense and not necessarily in a tangible, physical sense. Thus, although signal and/or state components of a file and/or an electronic document, for example, are to be associated logically, storage thereof, for example, may reside in one or more different places in a tangible, physical memory, in an embodiment.

A Hyper Text Markup Language ("HTML"), for example, may be utilized to specify digital content and/or to specify a format thereof, such as in the form of an electronic file and/or an electronic document, such as a Web page, Web site, etc., for example. An Extensible Markup Language ("XML") may also be utilized to specify digital content and/or to specify a format thereof, such as in the form of an electronic file and/or an electronic document, such as a Web page, Web site, etc., in an embodiment. Of course, HTML and/or XML are merely examples of "markup" languages, provided as non-limiting illustrations. Furthermore, HTML and/or XML are intended to refer to any version, now known and/or to be later developed, of these languages. Likewise, claimed subject matter are not intended to be limited to examples provided as illustrations, of course.

In the context of the present disclosure, the term "Web site" and/or similar terms refer to Web pages that are associated electronically to form a particular collection thereof. Also, in the context of the present disclosure, "Web page" and/or similar terms refer to an electronic file and/or an electronic document accessible via a network, including by specifying a uniform resource locator (URL) for accessibility via the Web, in an example embodiment. As alluded to above, in one or more embodiments, a Web page may comprise digital content coded (e.g., via computer instructions) using one or more languages, such as, for example, markup languages, including HTML and/or XML, although claimed subject matter is not limited in scope in this respect. Also, in one or more embodiments, application developers may write code (e.g., computer instructions) in the form of JavaScript (or other programming languages), for example, executable by a computing device to provide digital content to populate an electronic document and/or an electronic file in an appropriate format, such as for use in a particular application, for example. Use of the term "JavaScript" and/or similar terms intended to refer to one or more particular programming languages are intended to refer to any version of the one or more programming languages identified, now known and/or to be later developed. Thus, JavaScript is merely an example programming language. As was mentioned, claimed subject matter is not intended to be limited to examples and/or illustrations.

As was indicated, in the context of the present disclosure, the terms "entry," "electronic entry," "document," "electronic document," "content,", "digital content," "item," and/or similar terms are meant to refer to signals and/or states in a physical format, such as a digital signal and/or digital state format, e.g., that may be perceived by a user if displayed, played, tactilely generated, etc. and/or otherwise executed by a device, such as a digital device, including, for example, a computing device, but otherwise might not necessarily be readily perceivable by humans (e.g., if in a digital format). Likewise, in the context of the present disclosure, digital content provided to a user in a form so that the user is able to readily perceive the underlying content itself (e.g., content presented in a form consumable by a human, such as hearing audio, feeling tactile sensations and/or seeing images, as examples) is referred to, with respect to the user, as "consuming" digital content, "consumption" of digital content, "consumable" digital content and/or similar terms. For one or more embodiments, an electronic document and/or an electronic file may comprise a Web page of code (e.g., computer instructions) in a markup language executed or to be executed by a computing and/or networking device, for example. In another embodiment, an electronic document and/or electronic file may comprise a portion and/or a region of a Web page. However, claimed subject matter is not intended to be limited in these respects.

Also, for one or more embodiments, an electronic document and/or electronic file may comprise a number of components. As previously indicated, in the context of the present disclosure, a component is physical, but is not necessarily tangible. As an example, components with reference to an electronic document and/or electronic file, in one or more embodiments, may comprise text, for example, in the form of physical signals and/or physical states (e.g., capable of being physically displayed and/or maintained as a memory state in a tangible memory). Typically, memory states, for example, comprise tangible components, whereas physical signals are not necessarily tangible, although signals may become (e.g., be made) tangible, such as if appearing on a tangible display, for example, as is not uncommon. Also, for one or more embodiments, components with reference to an electronic document and/or electronic file may comprise a graphical object, such as, for example, an image, such as a digital image, and/or sub-objects, including attributes thereof, which, again, comprise physical signals and/or physical states (e.g., capable of being tangibly displayed and/or maintained as a memory state in a tangible memory). In an embodiment, digital content may comprise, for example, text, images, audio, video, haptic content and/or other types of electronic documents and/or electronic files, including portions thereof, for example.

Also, in the context of the present disclosure, the term parameters (e.g., one or more parameters) refer to material descriptive of a collection of signal samples, such as one or more electronic documents and/or electronic files, and exist in the form of physical signals and/or physical states, such as memory states. For example, one or more parameters, such as referring to an electronic document and/or an electronic file comprising an image, may include, as examples, time of day at which an image was captured, latitude and longitude of an image capture device, such as a camera, for example, etc. In another example, one or more parameters relevant to digital content, such as digital content comprising a technical article, as an example, may include one or more authors, for example. Claimed subject matter is intended to embrace meaningful, descriptive parameters in any format, so long as the one or more parameters comprise physical signals and/or states, which may include, as parameter examples, collection name (e.g., electronic file and/or electronic document identifier name), technique of creation, purpose of creation, time and date of creation, logical path if stored, coding formats (e.g., type of computer instructions, such as a markup language) and/or standards and/or specifications used so as to be protocol compliant (e.g., meaning substantially compliant and/or substantially compatible) for one or more uses, and so forth.

Signal packet communications and/or signal frame communications, also referred to as signal packet transmissions and/or signal frame transmissions (or merely "signal packets" or "signal frames"), may be communicated between nodes of a network, where a node may comprise one or more network devices and/or one or more computing devices, for example. As an illustrative example, but without limitation, a node may comprise one or more sites employing a local network address, such as in a local network address space. Likewise, a device, such as a network device and/or a computing device, may be associated with that node. It is also noted that in the context of this disclosure, the term "transmission" is intended as another term for a type of signal communication that may occur in any one of a variety of situations. Thus, it is not intended to imply a particular directionality of communication and/or a particular initiating end of a communication path for the "transmission" communication. For example, the mere use of the term in and of itself is not intended, in the context of the present disclosure, to have particular implications with respect to the one or more signals being communicated, such as, for example, whether the signals are being communicated "to" a particular device, whether the signals are being communicated "from" a particular device, and/or regarding which end of a communication path may be initiating communication, such as, for example, in a "push type" of signal transfer or in a "pull type" of signal transfer. In the context of the present disclosure, push and/or pull type signal transfers are distinguished by which end of a communications path initiates signal transfer.

Thus, a signal packet and/or frame may, as an example, be communicated via a communication channel and/or a communication path, such as comprising a portion of the Internet and/or the Web, from a site via an access node coupled to the Internet or vice-versa. Likewise, a signal packet and/or frame may be forwarded via network nodes to a target site coupled to a local network, for example. A signal packet and/or frame communicated via the Internet and/or the Web, for example, may be routed via a path, such as either being "pushed" or "pulled," comprising one or more gateways, servers, etc. that may, for example, route a signal packet and/or frame, such as, for example, substantially in accordance with a target and/or destination address and availability of a network path of network nodes to the target and/or destination address. Although the Internet and/or the Web comprise a network of interoperable networks, not all of those interoperable networks are necessarily available and/or accessible to the public.

In the context of the particular disclosure, a network protocol, such as for communicating between devices of a network, may be characterized, at least in part, substantially in accordance with a layered description, such as the so-called Open Systems Interconnection (OSI) seven layer type of approach and/or description. A network computing and/or communications protocol (also referred to as a network protocol) refers to a set of signaling conventions, such as for communication transmissions, for example, as may take place between and/or among devices in a network. In the context of the present disclosure, the term "between" and/or similar terms are understood to include "among" if appropriate for the particular usage and vice-versa. Likewise, in the context of the present disclosure, the terms "compatible with," "comply with" and/or similar terms are understood to respectively include substantial compatibility and/or substantial compliance.

A network protocol, such as protocols characterized substantially in accordance with the aforementioned OSI description, has several layers. These layers are referred to as a network stack. Various types of communications (e.g., transmissions), such as network communications, may occur across various layers. A lowest level layer in a network stack, such as the so-called physical layer, may characterize how symbols (e.g., bits and/or bytes) are communicated as one or more signals (and/or signal samples) via a physical medium (e.g., twisted pair copper wire, coaxial cable, fiber optic cable, wireless air interface, combinations thereof, etc.). Progressing to higher-level layers in a network protocol stack, additional operations and/or features may be available via engaging in communications that are substantially compatible and/or substantially compliant with a particular network protocol at these higher-level layers. For example, higher-level layers of a network protocol may, for example, affect device permissions, user permissions, etc.

A network and/or sub-network, in an embodiment, may communicate via signal packets and/or signal frames, such via participating digital devices and may be substantially compliant and/or substantially compatible with, but is not limited to, now known and/or to be developed, versions of any of the following network protocol stacks: ARCNET, AppleTalk, ATM, Bluetooth, DECnet, Ethernet, FDDI, Frame Relay, HIPPI, IEEE 1394, IEEE 802.11, IEEE-488, Internet Protocol Suite, IPX, Myrinet, OSI Protocol Suite, QsNet, RS-232, SPX, System Network Architecture, Token Ring, USB, and/or X.25. A network and/or sub-network may employ, for example, a version, now known and/or later to be developed, of the following: TCP/IP, UDP, DECnet, NetBEUI, IPX, AppleTalk and/or the like. Versions of the Internet Protocol (IP) may include IPv4, IPv6, and/or other later to be developed versions.

Regarding aspects related to a network, including a communications and/or computing network, a wireless network may couple devices, including client devices, with the network. A wireless network may employ stand-alone, ad-hoc networks, mesh networks, Wireless LAN (WLAN) networks, cellular networks, and/or the like. A wireless network may further include a system of terminals, gateways, routers, and/or the like coupled by wireless radio links, and/or the like, which may move freely, randomly and/or organize themselves arbitrarily, such that network topology may change, at times even rapidly. A wireless network may further employ a plurality of network access technologies, including a version of Long Term Evolution (LTE), WLAN, Wireless Router (WR) mesh, 2nd, 3rd, 4th, or 5th generation (2G, 3G, 4G, or 5G) cellular technology and/or the like, whether currently known and/or to be later developed. Network access technologies may enable wide area coverage for devices, such as computing devices and/or network devices, with varying degrees of mobility, for example.

A network may enable radio frequency and/or other wireless type communications via a wireless network access technology and/or air interface, such as Global System for Mobile communication (GSM), Universal Mobile Telecommunications System (UMTS), General Packet Radio Services (GPRS), Enhanced Data GSM Environment (EDGE), 3GPP Long Term Evolution (LTE), LTE Advanced, Wideband Code Division Multiple Access (WCDMA), Bluetooth, ultra-wideband (UWB), IEEE 802.11 (including, but not limited to, IEEE 802.11b/g/n), and/or the like. A wireless network may include virtually any type of now known and/or to be developed wireless communication mechanism and/or wireless communications protocol by which signals may be communicated between devices, between networks, within a network, and/or the like, including the foregoing, of course. For example, in some instances, a network may comprise an IoT centric network, such as discussed above.

Figure 8:
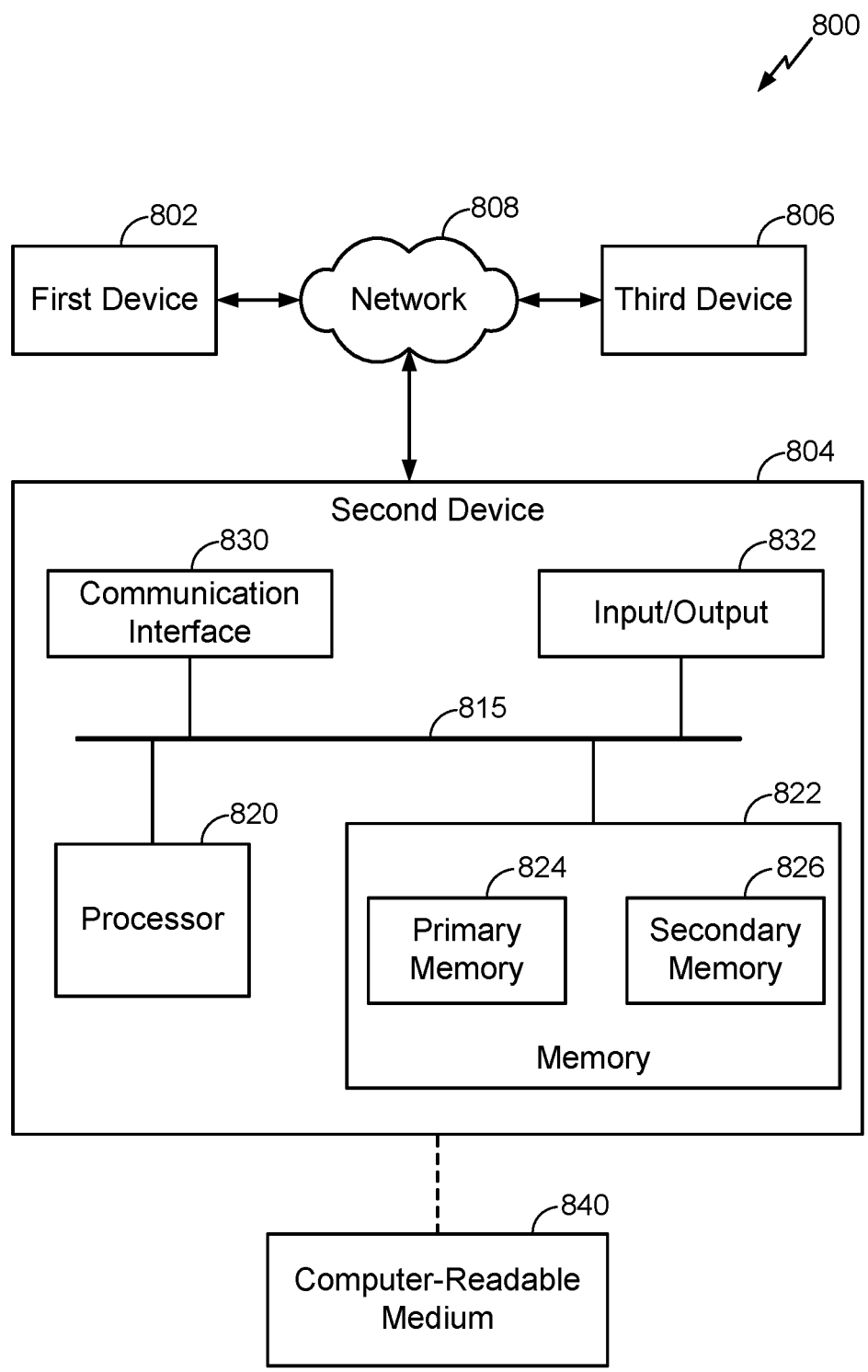
FIG. 8 is a schematic diagram illustrating an implementation of an example computing environment.

In one example embodiment, as shown in FIG. 8, a system embodiment may comprise a local network (e.g., a second device 804 and a computer-readable medium 840) and/or another type of network, such as a computing and/or communications network. For purposes of illustration, therefore, FIG. 8 shows an embodiment 800 of a system that may be employed to implement either type or both types of networks, such as in connection with one or more operations and/or techniques for blockchain infrastructure for securing and/or managing electronic artifacts. Network 808 may comprise one or more network connections, links, processes, services, applications, and/or resources to facilitate and/or support communications, such as an exchange of communication signals, for example, between a computing device, such as 802, and another computing device, such as 806, which may, for example, comprise one or more client computing devices and/or one or more server computing device. By way of example, but not limitation, network 808 may comprise wireless and/or wired communication links, telephone and/or telecommunications systems, Wi-Fi networks, Wi-MAX networks, the Internet, a local area network (LAN), a wide area network (WAN), an IoT centric network and/or protocol, or any combinations thereof. Again, particular examples of IoT centric wireless networks and protocols were discussed above.

Example devices in FIG. 8 may comprise features, for example, of a client computing device and/or a server computing device, in an embodiment. It is further noted that the term computing device, in general, whether employed as a client and/or as a server, or otherwise, refers at least to a processor and a memory connected by a communication bus. Likewise, in the context of the present disclosure at least, this is understood to refer to sufficient structure within the meaning of 35 § USC 112 (f) so that it is specifically intended that 35 § USC 112 (f) not be implicated by use of the term "computing device" and/or similar terms; however, if it is determined, for some reason not immediately apparent, that the foregoing understanding cannot stand and that 35 § USC 112 (f) therefore, necessarily is implicated by the use of the term "computing device" and/or similar terms, then, it is intended, pursuant to that statutory section, that corresponding structure, material and/or acts for performing one or more functions be understood and be interpreted to be described at least in FIGS. 1, 2, and 4-7, and the corresponding description in the present disclosure.

As further illustrated in FIG. 8, in an embodiment, first and third devices 802 and 806 may be capable of rendering a graphical user interface (GUI) for a network device and/or a computing device, for example, so that a user-operator may engage in system use. Device 804 may potentially serve a similar function in this illustration. Likewise, in FIG. 8, computing device 802 ('first device' in figure) may interface with computing device 804 ('second device' in figure), which may, for example, also comprise features of a client computing device and/or a server computing device, in an embodiment. Processor (e.g., processing device) 820 and memory 822, which may comprise primary memory 824 and secondary memory 826, may communicate by way of a communication bus 815, for example. The term "computing device," in the context of the present disclosure, refers to a system and/or a device, such as a computing apparatus, that includes a capability to process (e.g., perform computations) and/or store digital content, such as electronic files, electronic documents, measurements, text, images, video, audio, etc. in the form of signals and/or states. Thus, a computing device, in the context of the present disclosure, may comprise hardware, software, firmware, or any combination thereof (other than software per se). Computing device 804, as depicted in FIG. 8, is merely one example, and claimed subject matter is not limited in scope to this particular example.

For one or more embodiments, a computing device may comprise, for example, any of a wide range of digital electronic devices, including, but not limited to, desktop and/or notebook computers, high-definition televisions, digital versatile disc (DVD) and/or other optical disc players and/or recorders, game consoles, satellite television receivers, cellular telephones, tablet devices, wearable devices, personal digital assistants, mobile audio and/or video playback and/or recording devices, or any combination of the foregoing. Further, unless specifically stated otherwise, a process as described, such as with reference to flow diagrams and/or otherwise, may also be executed and/or affected, in whole or in part, by a computing device and/or a network device. A device, such as a computing device and/or network device, may vary in terms of capabilities and/or features. Claimed subject matter is intended to cover a wide range of potential variations. For example, a device may include a numeric keypad and/or other display of limited functionality, such as a monochrome liquid crystal display (LCD) for displaying text, for example. In contrast, however, as another example, a web-enabled device may include a physical and/or a virtual keyboard, mass storage, one or more accelerometers, one or more gyroscopes, global positioning system (GPS) and/or other location-identifying type capability, and/or a display with a higher degree of functionality, such as a touch-sensitive color 2D or 3D display, for example.

As suggested previously, communications between a computing device and/or a network device and a wireless network may be in accordance with known and/or to be developed network protocols including, for example, global system for mobile communications (GSM), enhanced data rate for GSM evolution (EDGE), 802.11b/g/n/h, etc., and/or worldwide interoperability for microwave access (Wi-MAX). A computing device and/or a networking device may also have a subscriber identity module (SIM) card, which, for example, may comprise a detachable or embedded smart card that is able to store subscription content of a user, and/or is also able to store a contact list. As also discussed, a computing device and/or a networking device may also have other identities. A user may own the computing device and/or network device or may otherwise be a user, such as a primary user, for example. A device may be assigned an address by a wireless network operator, a wired network operator, and/or an Internet Service Provider (ISP). For example, an address may comprise a domestic or international telephone number, an Internet Protocol (IP) address, and/or one or more other identifiers. In other embodiments, a computing and/or communications network may be embodied as a wired network, wireless network, or any combinations thereof.

A computing and/or network device may include and/or may execute a variety of now known and/or to be developed operating systems, derivatives and/or versions thereof, including computer operating systems, such as Windows, iOS, Linux, a mobile operating system, such as iOS, Android, Windows Mobile, and/or the like. A computing device and/or network device may include and/or may execute a variety of possible applications, such as a client software application enabling communication with other devices. For example, one or more messages (e.g., content) may be communicated, such as via one or more protocols, now known and/or later to be developed, suitable for communication of email, short message service (SMS), and/or multimedia message service (MMS), including via a network, such as a social network, formed at least in part by a portion of a computing and/or communications network, including, but not limited to, Facebook, LinkedIn, Twitter, Flickr, and/or Google+, to provide only a few examples. A computing and/or network device may also include executable computer instructions to process and/or communicate digital content, such as, for example, textual content, digital multimedia content, and/or the like. A computing and/or network device may also include executable computer instructions to perform a variety of possible tasks, such as browsing, searching, playing various forms of digital content, including locally stored and/or streamed video, and/or games such as, but not limited to, fantasy sports leagues. The foregoing is provided merely to illustrate that claimed subject matter is intended to include a wide range of possible features and/or capabilities.

In FIG. 8, computing device 802 may provide one or more sources of executable computer instructions in the form physical states and/or signals (e.g., stored in memory states), for example. Computing device 802 may communicate with computing device 804 by way of a network connection, such as via network 808, for example. As previously mentioned, a connection, while physical, may not necessarily be tangible. Although computing device 804 of FIG. 8 shows various tangible, physical components, claimed subject matter is not limited to computing devices having only these tangible components as other implementations and/or embodiments may include alternative arrangements that may comprise additional tangible components or fewer tangible components, for example, that function differently while achieving similar results. Rather, examples are provided merely as illustrations. It is not intended that claimed subject matter be limited in scope to illustrative examples.

Memory 822 may comprise any non-transitory storage mechanism. Memory 822 may comprise, for example, primary memory 824 and secondary memory 826, additional memory circuits, mechanisms, or combinations thereof may be used. Memory 822 may comprise, for example, random access memory, read only memory, etc., such as in the form of one or more storage devices and/or systems, such as, for example, a disk drive including an optical disc drive, a tape drive, a solid-state memory drive, etc., just to name a few examples.

Memory 822 may be utilized to store a program of executable computer instructions. For example, processor 820 may fetch executable instructions from memory and proceed to execute the fetched instructions. Memory 822 may also comprise a memory controller for accessing device readable-medium 840 that may carry and/or make accessible digital content, which may include code, and/or instructions, for example, executable by processor 820 and/or some other device, such as a controller, as one example, capable of executing computer instructions, for example. Under direction of processor 820, a non-transitory memory, such as memory cells storing physical states (e.g., memory states), comprising, for example, a program of executable computer instructions, may be executed by processor 820 and able to generate signals to be communicated via a network, for example, as previously described.

Thus, in some instances, processor 820 may facilitate and/or support, such as via a communication interface 830, for example, communicating electronically regarding one or more electronic transactions of one or more Internet of Things (IoT) devices on a network, at least some of the one or more IoT devices comprising at least one of the following: a sensor; an actuator; a middlebox; or any combination thereof, and wherein the one or more electronic transactions occurring substantially in accordance with one or more consensus rules of a blockchain through use of an integrated cost metric. Generated signals may also be stored in memory, also previously suggested. As was also discussed, in some instances, second device 804 may comprise one or more cryptographic hash accelerators, which may or may not be part of processor 820. It should be noted that any suitable types of cryptographic accelerators may be utilized herein. For example, in some instances, one or more key generators seeded by random number generators, such as for public key based authentication (e.g. RSA, etc.) and/or block encryption (e.g. AES, etc.) for data protection, at rest (e.g., stored as one or more signals and/or states in memory 822) or networked.

Memory 822 may store electronic files and/or electronic documents, such as relating to one or more users, and may also comprise a device-readable medium that may carry and/or make accessible content, including code and/or instructions, for example, executable by processor 820 and/or some other device, such as a controller, as one example, capable of executing computer instructions, for example. As previously mentioned, the term electronic file and/or the term electronic document are used throughout this document to refer to a set of stored memory states and/or a set of physical signals associated in a manner so as to thereby form an electronic file and/or an electronic document. That is, it is not meant to implicitly reference a particular syntax, format and/or approach used, for example, with respect to a set of associated memory states and/or a set of associated physical signals. It is further noted an association of memory states, for example, may be in a logical sense and not necessarily in a tangible, physical sense. Thus, although signal and/or state components of an electronic file and/or electronic document, are to be associated logically, storage thereof, for example, may reside in one or more different places in a tangible, physical memory, in an embodiment.

Algorithmic descriptions and/or symbolic representations are examples of techniques used by those of ordinary skill in the signal processing and/or related arts to convey the substance of their work to others skilled in the art. An algorithm is, in the context of the present disclosure, and generally, is considered to be a self-consistent sequence of operations and/or similar signal processing leading to a desired result. In the context of the present disclosure, operations and/or processing involve physical manipulation of physical quantities. Typically, although not necessarily, such quantities may take the form of electrical and/or magnetic signals and/or states capable of being stored, transferred, combined, compared, processed and/or otherwise manipulated, for example, as electronic signals and/or states making up components of various forms of digital content, such as signal measurements, text, images, video, audio, etc.

It has proven convenient at times, principally for reasons of common usage, to refer to such physical signals and/or physical states as bits, values, elements, parameters, symbols, characters, terms, numbers, numerals, measurements, content and/or the like. It should be understood, however, that all of these and/or similar terms are to be associated with appropriate physical quantities and are merely convenient labels. Unless specifically stated otherwise, as apparent from the preceding discussion, it is appreciated that throughout this specification discussions utilizing terms such as "processing," "computing," "calculating," "determining", "establishing", "obtaining", "identifying", "selecting", "generating", and/or the like may refer to actions and/or processes of a specific apparatus, such as a special purpose computer and/or a similar special purpose computing and/or network device. In the context of this specification, therefore, a special purpose computer and/or a similar special purpose computing and/or network device is capable of processing, manipulating and/or transforming signals and/or states, typically in the form of physical electronic and/or magnetic quantities, within memories, registers, and/or other storage devices, processing devices, and/or display devices of the special purpose computer and/or similar special purpose computing and/or network device. In the context of this particular disclosure, as mentioned, the term "specific apparatus" therefore includes a general purpose computing and/or network device, such as a general purpose computer, once it is programmed to perform particular functions, such as pursuant to program software instructions.

In some circumstances, operation of a memory device, such as a change in state from a binary one to a binary zero or vice-versa, for example, may comprise a transformation, such as a physical transformation. With particular types of memory devices, such a physical transformation may comprise a physical transformation of an article to a different state or thing. For example, but without limitation, for some types of memory devices, a change in state may involve an accumulation and/or storage of charge or a release of stored charge. Likewise, in other memory devices, a change of state may comprise a physical change, such as a transformation in magnetic orientation. Likewise, a physical change may comprise a transformation in molecular structure, such as from crystalline form to amorphous form or vice-versa. In still other memory devices, a change in physical state may involve quantum mechanical phenomena, such as, superposition, entanglement, and/or the like, which may involve quantum bits (qubits), for example. The foregoing is not intended to be an exhaustive list of all examples in which a change in state from a binary one to a binary zero or vice-versa in a memory device may comprise a transformation, such as a physical, but non-transitory, transformation. Rather, the foregoing is intended as illustrative examples.

Continuing with FIG. 8, processor 820 may comprise one or more circuits, such as digital circuits, to perform at least a portion of a computing procedure and/or process. By way of example, but not limitation, processor 820 may comprise one or more processors, such as controllers, microprocessors, microcontrollers, application specific integrated circuits, digital signal processors, programmable logic devices, field programmable gate arrays, the like, or any combination thereof. In various implementations and/or embodiments, processor 820 may perform signal processing, typically substantially in accordance with fetched executable computer instructions, such as to manipulate signals and/or states, to construct signals and/or states, etc., with signals and/or states generated in such a manner to be communicated and/or stored in memory, for example.

FIG. 8 also illustrates device 804 as including a component 832 operable with input/output devices, for example, so that signals and/or states may be appropriately communicated between devices, such as device 804 and an input device and/or device 804 and an output device. A user may make use of an input device, such as a computer mouse, stylus, track ball, keyboard, and/or any other similar device capable of receiving user actions and/or motions as input signals. Likewise, a user may make use of an output device, such as a display, a printer, etc., and/or any other device capable of providing signals and/or generating stimuli for a user, such as visual stimuli, audio stimuli and/or other similar stimuli.

In the preceding description, various aspects of claimed subject matter have been described. For purposes of explanation, specifics, such as amounts, systems and/or configurations, as examples, were set forth. In other instances, well-known features were omitted and/or simplified so as not to obscure claimed subject matter. While certain features have been illustrated and/or described herein, many modifications, substitutions, changes and/or equivalents will now occur to those skilled in the art. It is, therefore, to be understood that the appended claims are intended to cover all modifications and/or changes as fall within claimed subject matter.

What is claimed is:

1. A method comprising:
electronically detecting an absence of one or more status-check messages regarding an artifact stored as a plurality of shards on a corresponding plurality of storage nodes on a network, said one or more status-check messages being detected in accordance with one or more contract rules defining at least one of the following for said artifact: a change of an ownership; a change of a license; a type of a license; a jurisdictional requirement; a condition for release; a type of a release; or any combination thereof; and
communicating electronically to said plurality of storage nodes over said network a request to reconstitute said plurality of shards into said artifact based, at least in part, on said detected absence of said one or more status-check messages and said one or more contract rules, wherein said detected absence of said one or more status-check messages indicates that at least one of said one or more contract rules should be enforced, one or more of said electronically detecting or said communicating electronically at least partially occurring through use of one or more consensus mechanisms of one or more blockchains.

2. The method of claim 1, wherein said one or more contract rules are governed by at least one of the following: an escrow service contract; a conversion contract; a smart contract; or any combination thereof.

3. The method of claim 1, wherein said absence of said one or more status-check messages is detected in response to a message transmitted over said network.

4. The method of claim 3, wherein said message comprises a request for said one or more status-check messages.

5. The method of claim 3, wherein said message is transmitted a predetermined number of times.

6. The method of claim 3, wherein said message is transmitted over a predetermined time period.

7. The method of claim 3, wherein said message is transmitted randomly.

8. The method of claim 1, wherein said communicating electronically said request to reconstitute said plurality of shards is initiated after said absence of said one or more status-check messages is detected a threshold number of times.

9. The method of claim 1, wherein said plurality of shards comprise at least one of the following: a plurality of erasure-encoded shards; a plurality of encrypted shards; or any combination thereof.

10. The method of claim 1, wherein said one or more blockchains comprise a plurality of blockchains.

11. The method of claim 10, wherein said plurality of blockchains comprise a main blockchain and one or more sidechain blockchains linked with said main blockchain.

12. The method of claim 1, wherein said plurality of storage nodes comprise at least one of the following: a plurality of peering repository nodes; a plurality of non-peering repository nodes; or any combination thereof.

13. The method of claim 1, wherein said one or more status-check messages comprise one or more authenticated status-check messages.

14. The method of claim 1, wherein at least some of said plurality of storage nodes comprise mining nodes.

15. The method of claim 1, wherein said one or more blockchains comprise at least one of the following: one or more public blockchains; one or more private blockchains; or any combination thereof.

16. The method of claim 1, wherein said one or more blockchains are implemented to facilitate survivability of said artifact based, at least in part, on storing said plurality of shards on said corresponding plurality of storage nodes.

17. The method of claim 1, wherein said one or more blockchains are implemented to facilitate survivability of an escrow service based, at least in part, on storing said plurality of shards on said corresponding plurality of storage nodes.

18. An apparatus comprising:
one or more processors coupled to a memory to:
initiate an electronic detection of an absence of one or more status-check messages regarding an artifact stored as a plurality of shards on a corresponding plurality of storage nodes on a network, said one or more status-check messages to be detected in accordance with one or more contract rules that define at least one of the following for said artifact: a change of an ownership; a change of a license; a type of a license; a jurisdictional requirement; a condition for release; a type of a release; or any combination thereof; and
initiate an electronic communication with a request to said plurality of storage nodes over said network to reconstitute said plurality of shards into said artifact based, at least in part, on said detected absence of said one or more status-check messages and said one or more contract rules, wherein said detected absence of said one or more status-check messages indicates that at least one of said one or more contract rules should be enforced, one or more of said electronic detection or said electronic communication to at least partially occur through use of one or more consensus mechanisms of one or more blockchains.

19. The apparatus of claim 18, wherein said one or more contract rules are to be governed by at least one of the following: an escrow service contract; a conversion contract; a smart contract; or any combination thereof.

20. The apparatus of claim 18, wherein said absence of said one or more status-check messages is to be detected in response to a message transmitted over said network to request said one or more status-check messages.

21. An article comprising:
a non-transitory storage medium having instructions stored thereon executable by a special purpose computing platform to:
electronically detect an absence of one or more status-check messages regarding an artifact stored as a plurality of shards on a corresponding plurality of storage nodes on a network, said one or more status-check messages to be detected in accordance with one or more contract rules that define at least one of the following for said artifact: a change of an ownership; a change of a license; a type of a license; a jurisdictional requirement; a condition for release; a type of a release; or any combination thereof; and
communicate electronically to said plurality of storage nodes over said network a request to reconstitute said plurality of shards into said artifact based, at least in part, on said detected absence of said one or more status-check messages and said one or more contract rules, wherein said detected absence of said one or more status-check messages indicates that at least one of said one or more contract rules should be enforced, one or more of said electronic detection or said electronic communication to at least partially occur through use of one or more consensus mechanisms of one or more blockchains.

22. The article of claim 21, wherein said electronic communication to said plurality of storage nodes of said request to reconstitute said plurality of shards is to be initiated after said absence of said one or more status-check messages is detected a threshold number of times.

* * * * *